(12) United States Patent
Burger et al.

(10) Patent No.: US 7,835,951 B1
(45) Date of Patent: Nov. 16, 2010

(54) DISTRIBUTION CHANNEL MANAGEMENT FOR WIRELESS DEVICES AND SERVICES

(75) Inventors: Philip G. Burger, Allen, TX (US); Jonathan Edward Koch, New York, NY (US); C. Breck Morrison, Frisco, TX (US); G. Christopher Smith, Duluth, GA (US)

(73) Assignee: Brightpoint, Inc., Indianapolis, IN (US)

( * ) Notice: Subject to any disclaimer, the term of this patent is extended or adjusted under 35 U.S.C. 154(b) by 1564 days.

(21) Appl. No.: 10/338,345

(22) Filed: Jan. 8, 2003

Related U.S. Application Data

(60) Provisional application No. 60/346,520, filed on Jan. 8, 2002.

(51) Int. Cl.
  *G06Q 10/00* (2006.01)
  *G06Q 30/00* (2006.01)
(52) U.S. Cl. .......................................... 705/28; 705/26
(58) Field of Classification Search .............. 705/14.72, 705/26, 28, 38
  See application file for complete search history.

(56) References Cited

U.S. PATENT DOCUMENTS

| | | | |
|---|---|---|---|
| 5,386,455 A * | 1/1995 | Cooper | 455/419 |
| 5,815,732 A * | 9/1998 | Cooper et al. | 710/36 |
| 5,953,707 A * | 9/1999 | Huang et al. | 705/10 |
| 5,956,636 A * | 9/1999 | Lipsit | 455/411 |
| 6,243,574 B1 * | 6/2001 | McGregor et al. | 455/418 |
| 6,609,101 B1 * | 8/2003 | Landvater | 705/10 |
| 6,618,706 B1 * | 9/2003 | Rive et al. | 705/30 |
| 6,889,197 B2 * | 5/2005 | Lidow | 705/10 |
| 6,954,736 B2 * | 10/2005 | Menninger et al. | 705/28 |
| 7,260,550 B1 * | 8/2007 | Notani | 705/10 |
| 2002/0023001 A1 * | 2/2002 | McFarlin et al. | 705/14 |

OTHER PUBLICATIONS

Steward, Shawn, Self-Serve Customers, Cellular Business, Jul. 1995, 12, 7, p. 40.*

* cited by examiner

*Primary Examiner*—Matthew S Gart
*Assistant Examiner*—Scott A Zare
(74) *Attorney, Agent, or Firm*—Ice Miller LLP

(57) ABSTRACT

A system and method for distribution channel management for devices and services in the wireless telecommunications industry are disclosed. A product ordering software module is integrated with an activation and credit scoring software module, a commissions management software module, and a coop management software module, wherein the software modules are optionally integrated with additional software modules for product and service management, and report generation. A plurality of geographically distributed dealer agents who operate retail interfaces with customers use a web-based interface with the software modules and a data link with one or more distribution centers for delivery of wireless devices from a plurality of wireless device manufacturers, and with one or more carriers providing the subscription services activated for the customers via the activation and credit scoring software module.

15 Claims, 24 Drawing Sheets

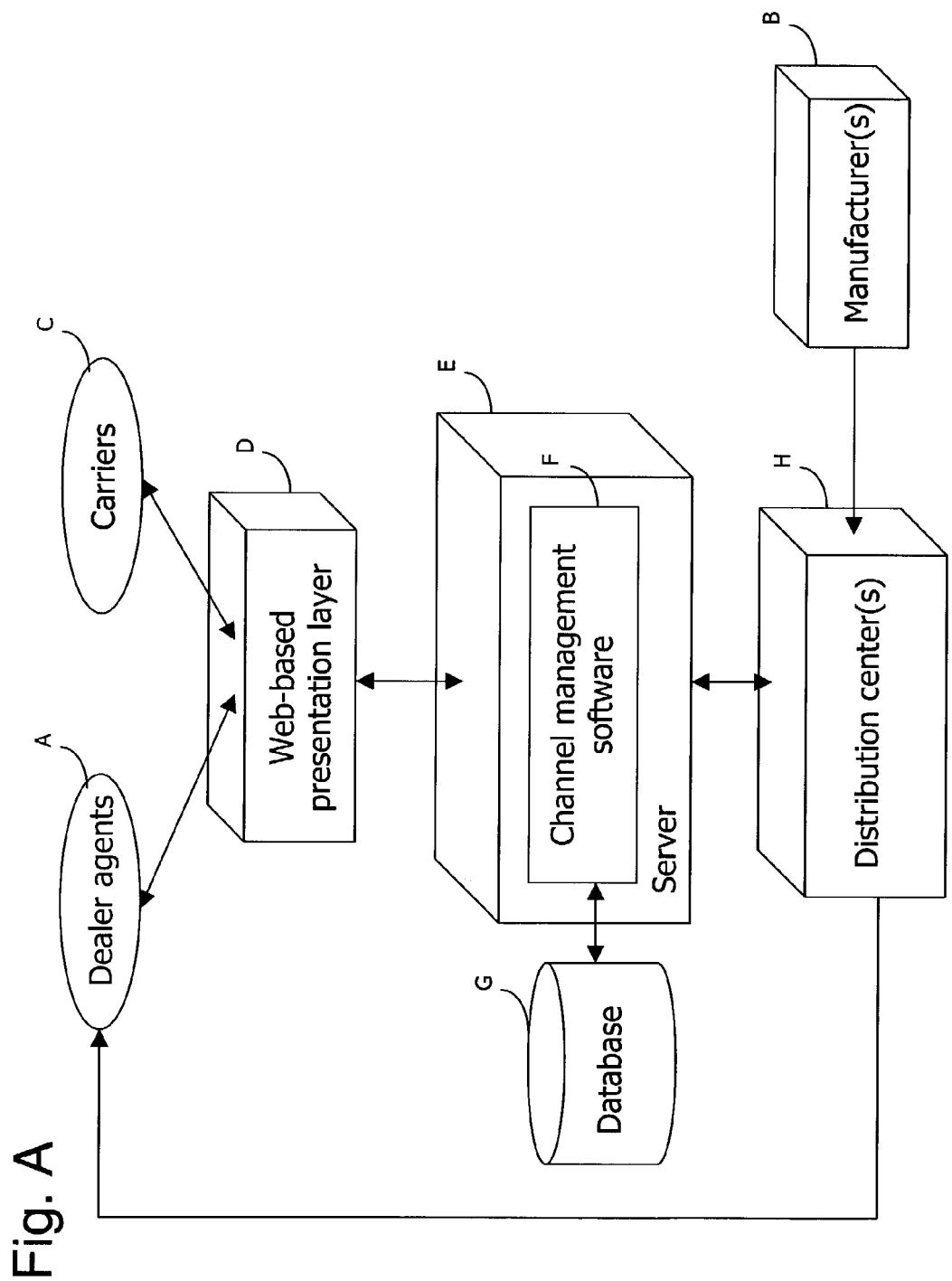
Fig. A

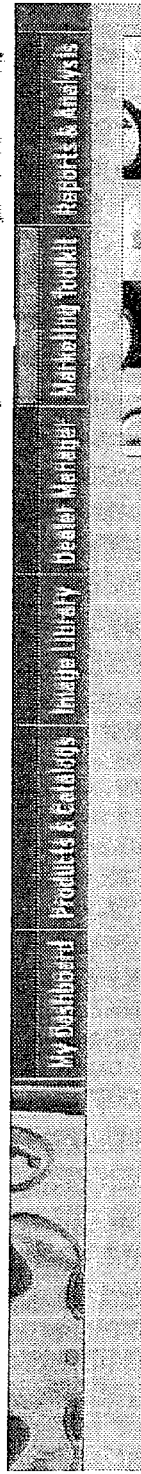
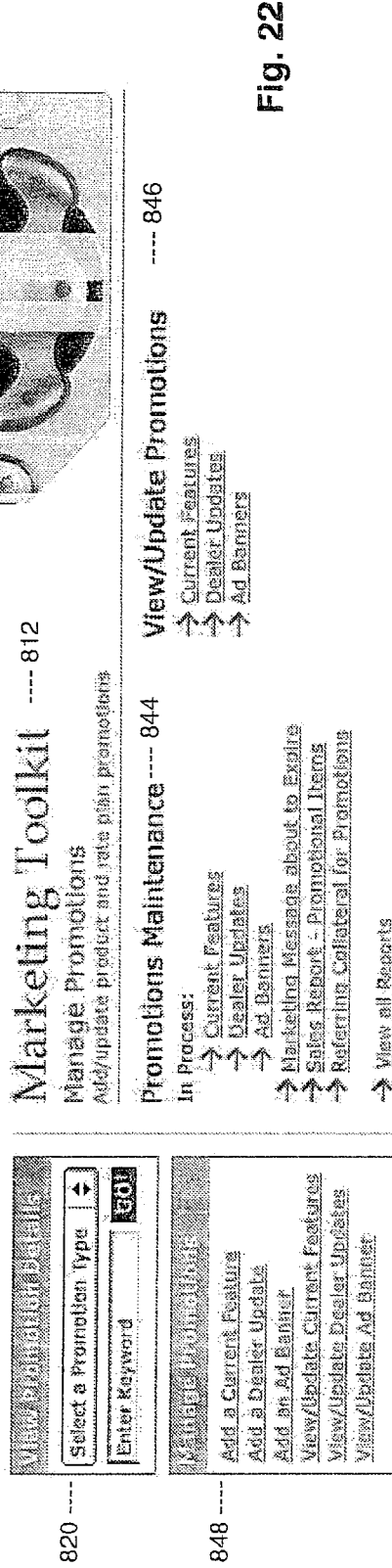
Fig. 22

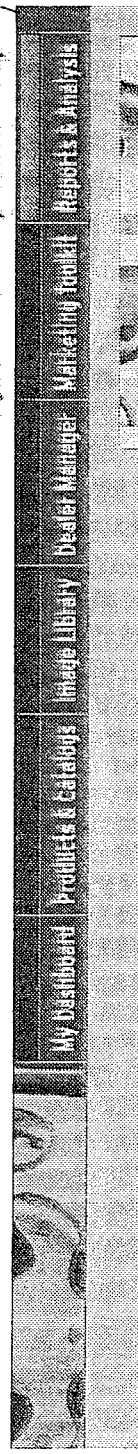
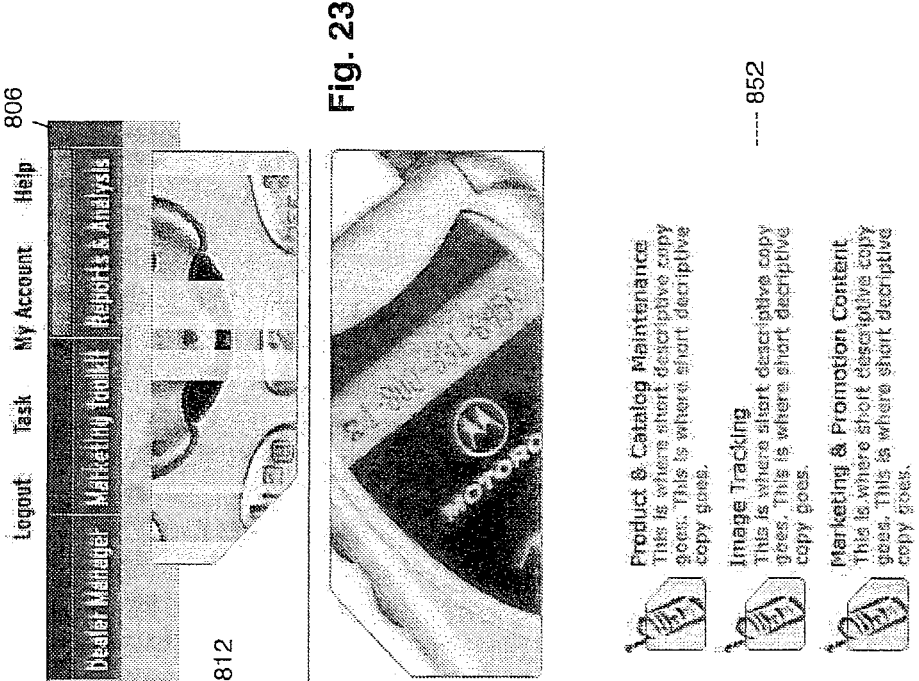
Fig. 23

DISTRIBUTION CHANNEL MANAGEMENT FOR WIRELESS DEVICES AND SERVICES

CROSS REFERENCE TO RELATED APPLICATION

This application claims the benefit of provisional application U.S. Ser. No. 60/346,520, filed Jan. 8, 2002.

COPYRIGHT STATEMENT UNDER 37 C.F.R. §1.71(E)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO COMPUTER PROGRAM LISTING APPENDIX

This application includes a computer program listing appendix submitted on compact disc, which is hereby incorporated herein by reference. The total number of compact discs submitted herewith including identical duplicates is two. The files listed in the computer program listing appendix are as follows:

```
Directory of CD
01/03/2003 03:05p          <DIR>        .
01/03/2003 03:05p          <DIR>        ..
01/03/2003 03:04p          <DIR>        CMA
01/03/2003 03:04p          <DIR>        Components
01/03/2003 03:06p                     1 file_list.txt
01/03/2003 03:06p                    43 copyright.txt
01/03/2003 03:04p          <DIR>        OrderStar
        1 File(s)              0 bytes
Directory of CMA
01/03/2003 03:04p          <DIR>        .
01/03/2003 03:04p          <DIR>        ..
01/03/2003 03:04p          <DIR>        ContentTargeter
01/03/2003 03:04p          <DIR>        JDE - MQ
01/03/2003 03:04p          <DIR>        TxBroker
        0 File(s)              0 bytes
Directory of CMA\ContentTargeter
01/03/2003 03:04p          <DIR>        .
01/03/2003 03:04p          <DIR>        ..
01/03/2003 03:04p          <DIR>        AdManager
01/03/2003 03:04p          <DIR>        CMACore
01/03/2003 03:04p          <DIR>        contentProvider
01/03/2003 03:04p          <DIR>        ContentTargeter
        0 File(s)              0 bytes
Directory of CMA\ContentTargeter\AdManager
01/03/2003 03:04p          <DIR>        .
01/03/2003 03:04p          <DIR>        ..
12/04/2002 02:40p                 2,426 AssemblyInfo.cs
01/03/2003 12:23p                16,963 frmAdManager.cs
12/04/2002 02:40p                 6,178 frmAdManager.resx
12/04/2002 02:40p                25,209 frmMessageDetails.cs
12/04/2002 02:40p                 5,327 frmMessageDetails.resx
12/04/2002 02:40p                 9,657 frmTargetDetails.cs
12/04/2002 02:40p                 5,326 frmTargetDetails.resx
        7 File(s)         71,086 bytes
Directory of CMA\ContentTargeter\CMACore
01/03/2003 03:04p          <DIR>        .
01/03/2003 03:04p          <DIR>        ..
12/04/2002 02:40p                 2,426 AssemblyInfo.cs
12/04/2002 02:40p                22,395 CMACore.cs
12/04/2002 02:40p                 6,256 CMALog.cs
        3 File(s)         31,077 bytes
Directory of CMA\ContentTargeter\contentProvider
01/03/2003 03:04p          <DIR>        .
01/03/2003 03:04p          <DIR>        ..
12/04/2002 02:40p                 2,781 AssemblyInfo.cs
12/04/2002 02:40p                   151 contentProvider.aspx
12/04/2002 02:40p                 2,630 contentProvider.aspx.cs
12/04/2002 02:40p                 1,733 contentProvider.aspx.resx
12/04/2002 02:40p                   638 default.aspx
12/04/2002 02:40p                 1,054 default.aspx.cs
12/04/2002 02:40p                 1,733 default.aspx.resx
12/04/2002 02:40p                   120 echo.aspx
12/04/2002 02:40p                 1,361 echo.aspx.cs
12/04/2002 02:40p                 1,733 echo.aspx.resx
12/04/2002 02:40p                    82 Global.asax
12/04/2002 02:40p                 1,256 Global.asax.cs
12/04/2002 02:40p                 1,733 Global.asax.resx
12/04/2002 02:40p                 1,502 messageGrid.aspx
```

-continued

| | | |
|---|---:|---|
| 12/04/2002 02:40p | 2,430 | messageGrid.aspx.cs |
| 12/04/2002 02:40p | 1,733 | messageGrid.aspx.resx |
| 16 File(s) | 22,670 bytes | |

Directory of CMA\ContentTargeter\ContentTargeter

| | | |
|---|---:|---|
| 01/03/2003 03:04p | <DIR> | . |
| 01/03/2003 03:04p | <DIR> | .. |
| 12/04/2002 02:40p | 2,426 | AssemblyInfo.cs |
| 12/04/2002 02:40p | 1,660 | B48AAFF0-8CA0-4483-B7D0-044BDA4975B6.xml |
| 12/04/2002 02:40p | 2,416 | Banner.Stylesheet.xml |
| 01/03/2003 12:25p | 77,143 | ContentTargeter.cs |
| 12/04/2002 02:40p | 1,098 | marketing.message.xml |
| 12/04/2002 02:40p | 638 | MarketingMessage.Request.xml |
| 12/04/2002 02:40p | 2,880 | MarketingMessage.Response.xml |
| 12/04/2002 02:40p | 108 | ox.targets.xml |
| 12/04/2002 02:40p | 1,468 | TargetedContentManager.cs |
| 12/04/2002 02:40p | 4,665 | temp.xml |
| 10 File(s) | 94,502 bytes | |

Directory of CMA\JDE - MQ

| | | |
|---|---:|---|
| 01/03/2003 03:04p | <DIR> | . |
| 01/03/2003 03:04p | <DIR> | .. |
| 12/04/2002 02:40p | 105,008 | cmqb.bas |
| 12/31/2002 12:23p | 31,735 | JDEBroker.cls |
| 12/04/2002 02:40p | 14,386 | JDERequest.cls |
| 12/04/2002 02:40p | 6,596 | MQMessages.bas |
| 01/03/2003 03:04p | <DIR> | Stylesheets |
| 4 File(s) | 157,725 bytes | |

Directory of CMA\JDE - MQ\Stylesheets

| | | |
|---|---|---|
| 01/03/2003 03:04p | <DIR> | . |
| 01/03/2003 03:04p | <DIR> | .. |
| 01/03/2003 03:04p | <DIR> | JDEBroker |
| 01/03/2003 03:04p | <DIR> | JDERequest |
| 01/03/2003 03:04p | <DIR> | MQMessages |
| 0 File(s) | 0 bytes | |

Directory of CMA\JDE - MaStylesheets\JDEBroker

| | | |
|---|---:|---|
| 01/03/2003 03:04p | <DIR> | . |
| 01/03/2003 03:04p | <DIR> | .. |
| 12/04/2002 02:40p | 948 | ConvertToJDEBroker.mxp |
| 12/04/2002 02:40p | 568 | ConvertToJDEBroker.xsl |
| 12/04/2002 02:40p | 1,144 | ConvertToJDERequest.mxp |
| 12/04/2002 02:40p | 829 | ConvertToJDERequest.xsl |
| 12/04/2002 02:40p | 254 | ExtendedOrderInformationRequest.xml |
| 12/04/2002 02:40p | 626 | InventoryCommitRequestxml |
| 12/04/2002 02:40p | 873 | InventoryCommitResponse.xml |
| 12/04/2002 02:40p | 637 | Item PriceRequest.xml |
| 12/04/2002 02:40p | 1,260 | ItemPriceResponse.xml |
| 12/04/2002 02:40p | 1,343 | OrderSubmitRequest.xml |
| 12/04/2002 02:40p | 614 | ShipmentRequest.xml |
| 12/04/2002 02:40p | 208 | vssver.scc |
| 12 File(s) | 9,304 bytes | |

Directory of CMA\JDE - MQ\Stylesheets\JDERequest

| | | |
|---|---:|---|
| 01/03/2003 03:04p | <DIR> | . |
| 01/03/2003 03:04p | <DIR> | .. |
| 12/04/2002 02:40p | 1,022 | Check-Me.mxp |
| 12/04/2002 02:40p | 468 | Check-MeRequest.xml |
| 12/04/2002 02:40p | 518 | Check-MeRequest.xsl |
| 12/04/2002 02:40p | 70 | Check-MeResponse.xml |
| 12/04/2002 02:40p | 845 | Check-MeResponse.xsl |
| 12/04/2002 02:40p | 1,178 | CreditInformation.mxp |
| 12/04/2002 02:40p | 516 | CreditInformationRequest.xml |
| 12/04/2002 02:40p | 1,028 | CreditInformationRequest.xsl |
| 12/04/2002 02:40p | 88 | CreditInformationResponse.xml |
| 12/04/2002 02:40p | 1,078 | CreditInformationResponse.xsl |
| 12/04/2002 02:40p | 1,110 | CustomerInformation.mxp |
| 12/04/2002 02:40p | 573 | CustomerInformationRequest.xml |
| 12/04/2002 02:40p | 1,361 | CustomerInformationRequest.xsl |
| 12/04/2002 02:40p | 4,685 | CustomerInformationResponse.xml |
| 12/04/2002 02:40p | 2,764 | CustomerInformationResponse.xsl |
| 12/04/2002 02:40p | 1,234 | ExtendedOrderInformation.mxp |
| 12/04/2002 02:40p | 767 | ExtendedOrderInformationRequest.xml |
| 12/04/2002 02:40p | 3,527 | ExtendedOrderInformationRequest.xsl |
| 12/04/2002 02:40p | 108 | partExtendedOrderInformation-Response.xml |
| 12/04/2002 02:40p | 1,437 | ExtendedOrderInformationResponse.xsl |
| 12/04/2002 02:40p | 3,037 | Functions.xsl |
| 12/04/2002 02:40p | 1,162 | InventoryCommit.mxp |
| 12/04/2002 02:40p | 1,139 | InventoryCommitRequest.xml |
| 12/04/2002 02:40p | 2,623 | InventoryCommitRequest.xsl |
| 12/04/2002 02:40p | 224 | InventoryCommitResponse.xml |

-continued

| | | |
|---|---|---|
| 12/04/2002 02:40p | 2,103 | InventoryCommitResponse.xsl |
| 12/04/2002 02:40p | 1,086 | InventoryRelease.mxp |
| 12/04/2002 02:40p | 656 | InventoryReleaseRequest.xml |
| 12/04/2002 02:40p | 1,476 | InventoryReleaseRequest.xsl |
| 12/04/2002 02:40p | 104 | InventoryReleaseResponse.xml |
| 12/04/2002 02:40p | 1,012 | InventoryReleaseResponse.xsl |
| 12/04/2002 02:40p | 1,114 | ItemPrice.mxp |
| 12/04/2002 02:40p | 1,138 | Item PriceRequest.xml |
| 12/04/2002 02:40p | 1,857 | ItemPriceRequest.xsl |
| 12/04/2002 02:40p | 1,136 | ItemPriceResponse.xml |
| 12/04/2002 02:40p | 2,987 | ItemPriceResponse.xsl |
| 12/04/2002 02:40p | 1,094 | OrderConfirmation.mxp |
| 12/04/2002 02:40p | 527 | OrderConfirmationRequest.xml |
| 12/04/2002 02:40p | 1,037 | OrderConfirmationRequest.xsl |
| 12/04/2002 02:40p | 292 | OrderConfirmationResponse.xml |
| 12/04/2002 02:40p | 997 | OrderConfirmationResponse.xsl |
| 12/04/2002 02:40p | 1,046 | OrderDetail.mxp |
| 12/04/2002 02:40p | 649 | OrderDetailRequest.xml |
| 12/04/2002 02:40p | 1,359 | OrderDetailRequest.xsl |
| 12/04/2002 02:40p | 19,019 | OrderDetailResponse.xml |
| 12/31/2002 12:23p | 12,097 | OrderDetailResponse.xsl |
| 12/04/2002 02:40p | 1,030 | OrderList.mxp |
| 12/04/2002 02:40p | 531 | OrderListRequest.xml |
| 12/04/2002 02:40p | 1,235 | OrderListRequest.xsl |
| 12/04/2002 02:40p | 10,564 | OrderListResponse.xml |
| 12/04/2002 02:40p | 3,237 | OrderListResponse.xsl |
| 12/04/2002 02:40p | 1,126 | OrderShipmentTracking.mxp |
| 12/04/2002 02:40p | 562 | OrderShipmentTrackingRequest.xml |
| 12/04/2002 02:40p | 1,210 | OrderShipmentTrackingRequest.xsl |
| 12/04/2002 02:40p | 2,600 | OrderShiprnentTrackingResponse.xml |
| 12/31/2002 12:23p | 2,262 | OrderShipmentTrackingResponse.xsl |
| 12/04/2002 02:40p | 1,130 | OrderSubmit.mxp |
| 12/04/2002 02:40p | 2,070 | OrderSubmitRequest.xml |
| 12/04/2002 02:40p | 8,886 | OrderSubmitRequest.xsl |
| 12/04/2002 02:40p | 100 | OrderSubmitResponse.xml |
| 12/04/2002 02:40p | 1,082 | OrderSubmitResponse.xsl |
| 12/04/2002 02:40p | 1,046 | PaymentType.mxp |
| 12/04/2002 02:40p | 498 | PaymentTypeRequest.xml |
| 12/04/2002 02:40p | 1,017 | PaymentTypeRequest.xsl |
| 12/04/2002 02:40p | 231 | PaymentTypeResponse.xml |
| 12/04/2002 02:40p | 1,255 | PaymentTypeResponse.xsl |
| 12/04/2002 02:40p | 1,110 | RegisterNewCustomer.mxp |
| 12/04/2002 02:40p | 562 | RegisterNewCustomerRequest.xml |
| 12/04/2002 02:40p | 1,200 | RegisterNewCustomerRequest.xsl |
| 12/04/2002 02:40p | 58 | RegisterNewCustomerResponse.xml |
| 12/04/2002 02:40p | 890 | RegisterNewCustomerResponse.xsl |
| 12/04/2002 02:40p | 1,110 | ReturnAuthorization.mxp |
| 12/04/2002 02:40p | 1,209 | ReturnAuthorizationRequest.xml |
| 12/04/2002 02:40p | 3,208 | ReturnAuthorizationRequest.xsl |
| 12/04/2002 02:40p | 128 | ReturnAuthorizationResponse.xml |
| 12/04/2002 02:40p | 930 | ReturnAuthorizationResponse.xsl |
| 12/04/2002 02:40p | 1,022 | Shipment.mxp. |
| 12/04/2002 02:40p | 1,139 | ShipmentRequest.xml |
| 12/04/2002 02:40p | 3,887 | ShipmentRequest.xsl |
| 12/04/2002 02:40p | 112 | ShipmentResponse.xml |
| 12/04/2002 02:40p | 1,023 | ShipmentResponse.xsl |
| 12/04/2002 02:40p | 1,030 | UpdateMIN.mxp |
| 12/04/2002 02:40p | 607 | UpdateMINRequest.xml |
| 12/04/2002 02:40p | 1,839 | UpdateMINRequest.xsl |
| 12/04/2002 02:40p | 503 | UpdateMINResponse.xml |
| 12/04/2002 02:40p | 1,956 | UpdateMINResponse.xsl |
| 12/31/2002 12:23p | 1,408 | vssver.scc |
| 87 File(s) | 151,951 bytes | |

Directory of CMA\JDE - MQ\Stylesheets\MQMessages

| | | |
|---|---|---|
| 01/03/2003 03:04p | <DIR> | . |
| 01/03/2003 03:04p | <DIR> | .. |
| 12/04/2002 02:40p | 2,902 | ConvertFromJDE.xsl |
| 12/04/2002 02:40p | 1,243 | Message 51.xml |
| 12/04/2002 02:40p | 198 | Message 53.xml |
| 12/04/2002 02:40p | 80 | vssver.scc |
| 4 File(s) | 4,423 bytes | |

Directory of CMA\TxBroker

| | | |
|---|---|---|
| 01/03/2003 03:04p | <DIR> | . |
| 01/03/2003 03:04p | <DIR> | .. |
| 01/03/2003 03:04p | <DIR> | TxBroker |
| 01/03/2003 03:04p | <DIR> | TxBrokerClient |
| 0 File(s) | 0 bytes | |

-continued

```
Directory of CMA\TxBroker\TxBroker
01/03/2003 03:04p          <DIR>          .
01/03/2003 03:04p          <DIR>          ..
12/04/2002 02:40p                  2,426  AssemblyInfo.cs
12/04/2002 02:40p                    965  ItemPriceResponse.sample.xml
12/04/2002 02:40p                    462  partner.messages.sample.xml
12/04/2002 02:40p                    512  partner.sample.xml
12/04/2002 02:40p                    633  translation.list.xml
12/04/2002 02:40p                 40,551  TxBroker.cs
        6 File(s)          45,549 bytes
Directory of CMA\TxBroker\TxBrokerClient
01/03/2003 03:04p          <DIR>          .
01/03/2003 03:04p          <DIR>          ..
12/04/2002 02:40p                  2,426  AssemblyInfo.cs
12/04/2002 02:40p                  4,435  frmMenu.cs
12/04/2002 02:40p                  5,317  frmMenu.resx
12/04/2002 02:40p                  9,981  frmPartnerInformation.cs
12/04/2002 02:40p                  5,331  frmPartnerInformation.resx
12/04/2002 02:40p                 24,459  frmPartnerManager.cs
12/04/2002 02:40p                  5,327  frmPartnerManagerresx
12/04/2002 02:41p                  8,607  frmTranslationInformation.cs
12/04/2002 02:41p                  5,525  frmTranslationInformation.resx
12/04/2002 02:41p                 12,656  frmTxBroker.cs
12/04/2002 02:41p                  5,321  frmTxBroker.resx
       11 File(s)          89,385 bytes
Directory of Components
01/03/2003 03:04p          <DIR>          .
01/03/2003 03:04p          <DIR>          ..
01/03/2003 03:04p          <DIR>          AOSGUIFramework
01/03/2003 03:04p          <DIR>          AOSGUIHelper
01/03/2003 03:04p          <DIR>          AOSGUIXML
        0 File(s)           0 bytes
Directory of Components\AOSGUIFramework
01/03/2003 03:04p          <DIR>          .
01/03/2003 03:04p          <DIR>          ..
06/19/2002 09:06a                  2,277  AOSGUIGlobal.bas
01/02/2003 10:44a                 12,815  clsAOSGUIBuilder.cls
        2 File(s)          15,092 bytes
Directory of Components\AOSGUIHelper
01/03/2003 03:04p          <DIR>          .
01/03/2003 03:04p          <DIR>          ..
01/02/2003 11:05a                 38,043  clsAOSDataCom.cls
01/02/2003 11:06a                  9,691  clsAOSLog.cls
10/15/2002 01:24p                 16,554  clsAOSUser.cls
06/19/2002 09:06a                  2,558  clsMasterCode.cls
10/16/2002 08:41a                 13,823  clsMembershipMgr.cls
06/19/2002 09:06a                  5,316  clsMMTimer.cls
06/19/2002 09:06a                  2,465  clsMQ.cls
01/02/2003 11:06a                  4,179  clsServerinformation.cls
06/19/2002 09:06a                  3,503  clsValidator.cls
11/20/2002 11:39a                 21,077  clsXMLProcessor.cls
       10 File(s)         117,209 bytes
Directory of Components\AOSGUIXML
01/03/2003 03:04p          <DIR>          .
01/03/2003 03:04p          <DIR>          ..
12/30/2002 10:30a                 14,203  clsGUIProvider.cls
01/02/2003 11:15a                 79,291  clsObjAccount.cls
06/19/2002 12:21p                 16,873  clsObjBasket.cls
12/31/2002 12:10p                 72,583  clsObjCart.cls
01/02/2003 11:49a                 71,164  clsObjCheckout.cls
06/19/2002 09:06a                  4,959  clsObjDialog.cls
12/30/2002 10:30a                  9,334  clsObjHelp.cls
12/30/2002 10:30a                  9,887  clsObjNavigation.cls
12/30/2002 10:30a                  8,601  clsObjPage.cls
12/30/2002 10:30a                 30,460  clsObjProduct.cls
10/03/2002 08:27a                 13,136  clsObjSystem.cls
06/19/2002 09:06a                  6,549  clsResourceRequest.cls
12/30/2002 10:30a                  7,295  clsTargeter.cls
06/19/2002 09:06a                  1,044  IAOSDialog.cls
06/19/2002 09:06a                  1,418  IResourceResponse.cls
       15 File(s)         346,797 bytes
Directory of OrderStar
01/03/2003 03:04p          <DIR>          .
01/03/2003 03:04p          <DIR>          ..
01/03/2003 03:04p          <DIR>          account
12/09/2002 12:47p                    149  ACCReturn.asp
01/03/2003 03:04p          <DIR>          cart
12/09/2002 12:47p                    399  cookies.asp
12/30/2002 02:49p                  3,597  default.asp
```

-continued

| | | | |
|---|---|---|---|
| 01/03/2003 03:04p | <DIR> | | devRomulus |
| 01/03/2003 03:04p | <DIR> | | error |
| 12/09/2002 12:47p | | 2,576 | forgotPassword.asp |
| 12/09/2002 12:47p | | 2,657 | forgotPasswordResult.asp |
| 12/09/2002 12:47p | | 2,817 | formsLogin.asp |
| 12/09/2002 12:47p | | 4,486 | global.asa |
| 12/09/2002 12:47p | | 2,400 | GUIResource.Template.asp |
| 01/03/2003 03:04p | <DIR> | | help |
| 01/03/2003 03:04p | <DIR> | | includes |
| 01/03/2003 03:04p | <DIR> | | legal |
| 01/03/2003 03:04p | <DIR> | | menus |
| 01/03/2003 03:04p | <DIR> | | newFeatures |
| 01/03/2003 03:04p | <DIR> | | order |
| 01/03/2003 03:04p | <DIR> | | product |
| 12/09/2002 12:47p | | 950 | siteDown.asp |
| 12/09/2002 12:47p | | 14,893 | siteOutage.asp |
| 01/03/2003 03:04p | <DIR> | | xmlUtilities |
| 12/30/2002 10:34a | | 4,239 | xt_processLogin.asp |
| 12/09/2002 12:47p | | 352 | xt_processLogout.asp |
| 12 File(s) | | 39,515 bytes | |

Directory of OrderStar\account

| | | | |
|---|---|---|---|
| 01/03/2003 03:04p | <DIR> | | . |
| 01/03/2003 03:04p | <DIR> | | .. |
| 12/09/2002 12:47p | | 3,199 | accountStatus.asp |
| 12/09/2002 12:47p | | 3,473 | Announcement.asp |
| 12/09/2002 12:47p | | 3,972 | editProfile.asp |
| 12/09/2002 12:47p | | 3,322 | editProfileConfirmation.asp |
| 12/09/2002 12:47p | | 3,294 | myAccount.asp |
| 12/09/2002 12:47p | | 2,827 | myNewAccount.asp |
| 12/09/2002 12:47p | | 2,867 | NewAccountFailure.asp |
| 12/09/2002 12:47p | | 2,866 | NewAccountSuccess.asp |
| 12/09/2002 12:47p | | 2,744 | orderDetail.asp |
| 12/09/2002 12:47p | | 3,348 | orderInquiry.asp |
| 12/09/2002 12:47p | | 3,151 | orderView.asp |
| 12/09/2002 12:47p | | 2,998 | programmingInfo.asp |
| 12/09/2002 12:47p | | 3,865 | ShipToAddress.asp |
| 12/09/2002 12:47p | | 4,728 | xt_processEditProfile.asp |
| 12/09/2002 12:47p | | 4,099 | xt_processNewAccount.asp |
| 12/09/2002 12:47p | | 3,885 | xt_processNewAccountResult.asp |
| 16 File(s) | | 54,638 bytes | |

Directory of OrderStar\cart

| | | | |
|---|---|---|---|
| 01/03/2003 03:04p | <DIR> | | . |
| 01/03/2003 03:04p | <DIR> | | .. |
| 12/09/2002 12:47p | | 2,282 | cart.asp |
| 12/17/2002 09:14a | | 2,514 | emptyCart.asp |
| 12/09/2002 12:47p | | 2,820 | xt_processCart.asp |
| 3 File(s) | | 7,616 bytes | |

Directory of OrderStar\devRomulus

| | | | |
|---|---|---|---|
| 01/03/2003 03:04p | <DIR> | | . |
| 01/03/2003 03:04p | <DIR> | | .. |
| 01/03/2003 03:04p | <DIR> | | Templates |
| 0 File(s) | | 0 bytes | |

Directory of OrderStar\devRomulus\Templates

| | | | |
|---|---|---|---|
| 01/03/2003 03:04p | <DIR> | | . |
| 01/03/2003 03:04p | <DIR> | | .. |
| 01/03/2003 03:04p | <DIR> | | US |
| 0 File(s) | | 0 bytes | |

Directory of OrderStar\devRomulus\Templates\US

| | | | |
|---|---|---|---|
| 01/03/2003 03:04p | <DIR> | | . |
| 01/03/2003 03:04p | <DIR> | | .. |
| 01/03/2003 03:04p | <DIR> | | account |
| 01/03/2003 03:04p | <DIR> | | cart |
| 01/03/2003 03:04p | <DIR> | | dialog |
| 01/03/2003 03:04p | <DIR> | | help |
| 01/03/2003 03:04p | <DIR> | | legal |
| 01/03/2003 03:04p | <DIR> | | navigation |
| 01/03/2003 03:04p | <DIR> | | order |
| 01/03/2003 03:04p | <DIR> | | page |
| 01/03/2003 03:04p | <DIR> | | product |
| 01/03/2003 03:04p | <DIR> | | system |
| 01/03/2003 03:04p | <DIR> | | targeter |
| 0 File(s) | | 0 bytes | |

Directory of OrderStar\devRomulus\Templates\US\account

| | | | |
|---|---|---|---|
| 01/03/2003 03:04p | <DIR> | | . |
| 01/03/2003 03:04p | <DIR> | | .. |
| 12/09/2002 12:47p | | 6,536 | Account.AccountLanding.xsl |
| 12/09/2002 12:47p | | 345 | Account.EditProfile.xml |
| 12/09/2002 12:47p | | 6,327 | Account.EditProfile.xsl |
| 12/09/2002 12:47p | | 124 | Account.EditProfileConfirmation.xml |

-continued

| | | |
|---|---|---|
| 12/09/2002 12:47p | 1,433 | Account.EditProfileConfirmation.xsl |
| 12/09/2002 12:47p | 147 | Account.EditProfileResult.xml |
| 12/09/2002 12:47p | 262 | Account.EditProfileResult.xsl |
| 12/09/2002 12:47p | 116 | Account.ForgotPassword.xml |
| 12/09/2002 12:47p | 2,781 | Account.ForgotPassword.xsl |
| 12/09/2002 12:47p | 150 | Account.ForgotPasswordResult.xml |
| 12/09/2002 12:47p | 1,707 | Account.ForgotPasswordResult.xsl |
| 12/09/2002 12:47p | 2,077 | Account.Navigation.xml |
| 12/09/2002 12:47p | 7,941 | Account.Navigation.xsl |
| 12/09/2002 12:47p | 58 | Account.NewAccount.xml |
| 12/09/2002 12:47p | 9,559 | Account.NewAccount.xsl |
| 12/09/2002 12:47p | 118 | Account.NewAccountFailure.xml |
| 12/09/2002 12:47p | 1,371 | Account.NewAccountFailure.xsl |
| 12/09/2002 12:47p | 146 | Account.NewAccountResult.xml |
| 12/09/2002 12:47p | 262 | Account.NewAccountResult.xsl |
| 12/09/2002 12:47p | 120 | Account.NewAccountSuccess.xml |
| 12/09/2002 12:47p | 1,606 | Account.NewAccountSuccess.xsl |
| 12/30/2002 10:34a | 19,391 | Account.OrderDetail.xsl |
| 12/09/2002 12:47p | 2,428 | Account.OrderInquiry.xml |
| 12/09/2002 12:47p | 9,189 | Account.OrderInquiry.xsl |
| 12/09/2002 12:47p | 3,424 | Account.OrderList.xml |
| 12/09/2002 12:47p | 20,370 | Account.OrderList.xsl |
| 12/30/2002 10:34a | 21,134 | Account.OrderListByPO.xsl |
| 12/16/2002 09:21a | 8,548 | Account.ProgrammingInfo.xsl |
| 12/09/2002 12:47p | 292 | Account.Status.xml |
| 12/09/2002 12:47p | 3,842 | Account.Status.xsl |
| 12/09/2002 12:47p | 117 | Account.TechnicalError.xml |
| 12/09/2002 12:47p | 1,920 | Account.TechnicalError.xsl |
| 12/09/2002 12:47p | 58 | AccountNeedHelp.xml |
| 12/09/2002 12:47p | 1,106 | AccountNeedHelp.xsl |
| 34 File(s) | 135,005 bytes | |

Directory of OrderStar\devRomulus\Templates\US\cart

| | | |
|---|---|---|
| 01/03/2003 03:04p | <DIR> | . |
| 01/03/2003 03:04p | <DIR> | .. |
| 12/09/2002 12:47p | 124 | Cart.AddItem.xml |
| 12/09/2002 12:47p | 281 | Cart.AddItem.xsl |
| 12/09/2002 12:47p | 4,331 | Cart.AssociatedItems.xml |
| 12/09/2002 12:47p | 24,704 | Cart.AssociatedItems.xsl |
| 12/09/2002 12:47p | 6,273 | Cart.Content.xml |
| 12/12/2002 10:04a | 26,618 | Cart.Content.xsl |
| 12/09/2002 12:47p | 124 | Cart.Empty.xml |
| 12/09/2002 12:47p | 4,204 | Cart.Empty.xsl |
| 12/09/2002 12:47p | 136 | Cart.GetShopperID.xml |
| 12/09/2002 12:47p | 272 | Cart.GetShopperID.xsl |
| 12/09/2002 12:47p | 143 | Cart.QuickView.xml |
| 12/09/2002 12:47p | 4,377 | Cart.QuickView.xsl |
| 12/09/2002 12:47p | 129 | Cart.RemoveItem.xml |
| 12/09/2002 12:47p | 283 | Cart.RemoveItem.xsl |
| 12/09/2002 12:47p | 9,638 | Cart.Summary.xsl |
| 12/09/2002 12:47p | 127 | Cart.Update.xml |
| 12/09/2002 12:47p | 283 | Cart.Update.xsl |
| 12/09/2002 12:47p | 3,084 | Catalog.Content.xml |
| 12/09/2002 12:47p | 24,043 | Catalog.Content.xsl |
| 19 File(s) | 109,174 bytes | |

Directory of OrderStar\devRomulus\Templates\US\dialog

| | | |
|---|---|---|
| 01/03/2003 03:04p | <DIR> | . |
| 01/03/2003 03:04p | <DIR> | .. |
| 12/09/2002 12:47p | 103 | Dialog.Login.xml |
| 12/09/2002 12:47p | 5,305 | Dialog.Login.xsl |
| 12/09/2002 12:47p | 311 | Dialog.OrderStatus.xml |
| 12/09/2002 12:47p | 4,411 | Dialog.OrderStatus.xsl |
| 12/09/2002 12:47p | 111 | Dialog.ProductSearch.xml |
| 12/09/2002 12:47p | 3,129 | Dialog.ProductSearch.xsl |
| 6 File(s) | 13,370 bytes | |

Directory of OrderStar\devRomulus\Templates\US\help

| | | |
|---|---|---|
| 01/03/2003 03:04p | <DIR> | . |
| 01/03/2003 03:04p | <DIR> | .. |
| 12/09/2002 12:47p | 142 | Help.ContactUsResult.xml |
| 12/09/2002 12:47p | 262 | Help.ContactUsResult.xsl |
| 12/09/2002 12:47p | 2,097 | Help.Landing.xml |
| 12/09/2002 12:47p | 9,842 | Help.Landing.xsl |
| 12/09/2002 12:47p | 114 | Help.OrderStarFAQ.xml |
| 12/09/2002 12:47p | 18,388 | Help.OrderStarFAQ.xsl |
| 12/09/2002 12:47p | 5,993 | Help.SalesContact.xml |
| 12/09/2002 12:47p | 4,537 | Help.SalesContact.xsl |
| 12/09/2002 12:47p | 104 | Help.Success.xml |
| 12/09/2002 12:47p | 2,994 | Help.Success.xsl |
| 12/09/2002 12:47p | 114 | Help.UpdateBrowser.xml |
| 12/09/2002 12:47p | 2,359 | Help.UpdateBrowser.xsl |

-continued

| | | |
|---|---|---|
| 12/09/2002 12:47p | 224 | vssver.scc |
| 13 File(s) | 47,170 bytes | |

Directory of OrderStar\devRomulus\Templates\US\legal

| | | |
|---|---|---|
| 01/03/2003 03:04p | <DIR> | . |
| 01/03/2003 03:04p | <DIR> | .. |
| 12/09/2002 12:47p | 106 | Legal.Copyright.xml |
| 12/09/2002 12:47p | 4,406 | Legal.Copyright.xsl |
| 12/09/2002 12:47p | 112 | Legal.privacySecurity.xml |
| 12/09/2002 12:47p | 5,355 | Legal.privacySecurity.xsl |
| 12/09/2002 12:47p | 107 | Legal.TermsOfUse.xml |
| 12/09/2002 12:47p | 30,574 | Legal.TermsofUse.xsl |
| 6 File(s) | 40,660 bytes | |

Directory of OrderStar\devRomulus\Templates\US\navigation

| | | |
|---|---|---|
| 01/03/2003 03:04p | <DIR> | . |
| 01/03/2003 03:04p | <DIR> | .. |
| 12/09/2002 12:47p | 606 | Navigation.Catalog.xml |
| 12/09/2002 12:47p | 4,106 | Navigation.Catalog.xsl |
| 12/09/2002 12:47p | 363 | Navigation.Default.xml |
| 12/09/2002 12:47p | 5,648 | Navigation.Default.xsl |
| 12/09/2002 12:47p | 1,271 | Navigation.Menu.xml |
| 12/09/2002 12:47p | 4,026 | Navigation.Menu.xsl |
| 6 File(s) | 16,020 bytes | |

Directory of OrderStar\devRomulus\Templates\US\order

| | | |
|---|---|---|
| 01/03/2003 03:04p | <DIR> | . |
| 01/03/2003 03:04p | <DIR> | .. |
| 12/09/2002 12:47p | 114 | Order.Announcements.xml |
| 12/09/2002 12:47p | 2,201 | Order.Announcements.xsl |
| 12/09/2002 12:47p | 10,423 | Order.CustomerInfo.xsl |
| 12/09/2002 12:47p | 48,018 | Order.OrderForm.xsl |
| 12/12/2002 02:47p | 21,282 | Order.OrderReview.xsl |
| 12/30/2002 10:34a | 28,171 | Order.OrderSubmit.xsl |
| 12/30/2002 10:34a | 13,394 | Order.PrintSummary.xsl |
| 12/09/2002 12:47p | 105 | Order.ShippingChart.xml |
| 12/09/2002 12:47p | 29,684 | Order.ShippingChart.xsl |
| 9 File(s) | 153,392 bytes | |

Directory of OrderStar\devRomulus\Templates\US\page

| | | |
|---|---|---|
| 01/03/2003 03:04p | <DIR> | . |
| 01/03/2003 03:04p | <DIR> | .. |
| 12/09/2002 12:47p | 445 | navigation.css |
| 12/09/2002 12:47p | 4,425 | orderstar.css |
| 12/09/2002 12:47p | 258 | Page.ContentHeader.xml |
| 12/09/2002 12:47p | 1,646 | Page.ContentHeader.xsl |
| 12/09/2002 12:47p | 118 | Page.Footer.xml |
| 12/09/2002 12:47p | 2,861 | Page.Footer.xsl |
| 12/09/2002 12:47p | 126 | Page.LegalFooter.xml |
| 12/09/2002 12:47p | 1,214 | Page.LegalFooter.xsl |
| 12/09/2002 12:47p | 113 | Page.PreLoginContent.xml |
| 12/09/2002 12:47p | 7,881 | Page.PreLoginContent.xsl |
| 12/09/2002 12:47p | 416 | Page.Stylesheet.xsl |
| 12/09/2002 12:47p | 121 | Page.Titlebar.xml |
| 12/09/2002 12:47p | 3,620 | Page.Titlebar.xsl |
| 13 File(s) | 23,244 bytes | |

Directory of OrderStar\devRomulus\Templates\US\product

| | | |
|---|---|---|
| 01/03/2003 03:04p | <DIR> | . |
| 01/03/2003 03:04p | <DIR> | .. |
| 12/09/2002 12:47p | 1,911 | Product.AdvancedSearch.xml |
| 12/09/2002 12:47p | 6,656 | Product.AdvancedSearch.xsl |
| 12/09/2002 12:47p | 114 | Product.Announcements.xml |
| 12/09/2002 12:47p | 9,884 | Product.Announcements.xsl |
| 12/09/2002 12:47p | 7,885 | Product.CatalogList.xsl |
| 12/09/2002 12:47p | 20,562 | Product.CategoryList.xmI |
| 12/09/2002 12:47p | 4,992 | Product.CategoryList.xsl |
| 12/09/2002 12:47p | 559 | Product.ItemDetail.xml |
| 12/09/2002 12:47p | 12,965 | Product.ItemDetail.xsl |
| 12/09/2002 12:47p | 2,257 | Product.ItemList.xml |
| 12/09/2002 12:47p | 27,571 | Product.ItemList.xsl |
| 12/09/2002 12:47p | 5,815 | Product.Navigation.xml |
| 12/09/2002 12:47p | 11,810 | Product.Navigation.xsl |
| 12/09/2002 12:47p | 6,996 | Product.RelatedItemList.xml |
| 12/09/2002 12:47p | 9,679 | Product.RelatedItemList.xsl |
| 12/09/2002 12:47p | 9,329 | Product.SubCategoryList.xsl |
| 16 File(s) | 138,985 bytes | |

Directory of OrderStar\devRomulus\Templates\US\system

| | | |
|---|---|---|
| 01/03/2003 03:04p | <DIR> | . |
| 01/03/2003 03:04p | <DIR> | .. |
| 12/09/2002 12:47p | 143 | System.Login.xml |
| 12/09/2002 12:47p | 262 | System.Login.xsl |
| 2 File(s) | 405 bytes | |

-continued

```
Directory of OrderStar\devRomulus\Templates\US\targeter
01/03/2003  03:04p    <DIR>          .
01/03/2003  03:04p    <DIR>          ..
12/09/2002  12:47p             2,536 Targeter.BannerMessage.xsl
12/09/2002  12:47p             3,506 Targeter.MajorMessage.xsl
12/09/2002  12:47p             3,213 Targeter.MiniMessage.xsl
         3 File(s)         9,255 bytes
Directory of OrderStar\error
01/03/2003  03:04p    <DIR>          .
01/03/2003  03:04p    <DIR>          ..
12/09/2002  12:47p             6,450 ErrHandler.asp
         1 File(s)         6,450 bytes
Directory of OrderStar\help
01/03/2003  03:04p    <DIR>          .
01/03/2003  03:04p    <DIR>          ..
12/17/2002  09:16a             3,307 contactus.asp
12/17/2002  09:16a             3,315 OrderStarFAQ.asp
12/17/2002  09:16a             2,447 OrderStarUpdateBrowser.asp
12/17/2002  09:16a             3,364 salesMap.asp
12/17/2002  09:17a             3,379 success.asp
12/09/2002  12:47p             6,344 xt_processContactus.asp
         6 File(s)        22,156 bytes
Directory of OrderStar\includes
01/03/2003  03:04p    <DIR>          .
01/03/2003  03:04p    <DIR>          ..
01/03/2003  03:04p    <DIR>          account
01/03/2003  03:04p    <DIR>          cart
01/03/2003  03:04p    <DIR>          context
01/03/2003  03:04p    <DIR>          dialog
01/03/2003  03:04p    <DIR>          help
12/09/2002  12:47p               268 i_browserDetect.asp
12/09/2002  12:47p               824 i_contextLoginbox.asp
12/09/2002  12:47p               563 i_forgotPasswordContentasp
12/09/2002  12:47p               380 i_forgotPasswordResult.asp
12/09/2002  12:47p               311 i_getUserCredentials.asp
12/30/2002  10:34a             1,749 i_shopper.asp
01/03/2003  03:04p    <DIR>          js
01/03/2003  03:04p    <DIR>          legal
01/03/2003  03:04p    <DIR>          navigation
01/03/2003  03:04p    <DIR>          newFeatures
01/03/2003  03:04p    <DIR>          order
01/03/2003  03:04p    <DIR>          product
01/03/2003  03:04p    <DIR>          targeter
         6 File(s)         4,095 bytes
Directory of OrderStar\includes\account
01/03/2003  03:04p    <DIR>          .
01/03/2003  03:04p    <DIR>          ..
12/09/2002  12:47p             1,182 i_AccountNeedHelp.asp
12/09/2002  12:47p             1,195 i_accountStatusContent.asp
12/09/2002  12:47p             1,148 i_accountStatusHeader.asp
12/09/2002  12:47p               639 i_Annoucement.asp
12/09/2002  12:47p               683 i_editProfileConfirmation.asp
12/09/2002  12:47p               692 i_editProfileContent.asp
12/09/2002  12:47p             1,164 i_editProfileHeader.asp
12/09/2002  12:47p               205 i_myAccountContent.asp
12/09/2002  12:47p             1,140 i_myAccountHeader.asp
12/09/2002  12:47p               654 i_myAccountNavigation.asp
12/09/2002  12:47p             2,015 i_myNewAccountContent.asp
12/09/2002  12:47p             1,201 i_myNewAccountHeader.asp
12/09/2002  12:47p               647 i_NewAccountFailureContent.asp
12/09/2002  12:47p             2,083 i_NewAccountFailureHeader.asp
12/09/2002  12:47p               667 i_NewAccountSuccessContent.asp
12/09/2002  12:47p             1,210 i_NewAccountSuccessHeader.asp
12/30/2002  10:34a             2,708 i_orderDetail.asp
12/09/2002  12:47p             1,093 i_orderDetailHeader.asp
12/09/2002  12:47p               906 i_orderInquiryContent.asp
12/09/2002  12:47p             1,114 i_orderInquiryHeaderasp
12/09/2002  12:47p             2,453 i_orderView.asp
12/09/2002  12:47p             1,117 i_orderViewHeader.asp
12/16/2002  09:21a             1,678 i_programmingInfo.asp
12/09/2002  12:47p             1,122 i_programmingInfoHeader.asp
12/09/2002  12:47p               451 i_ShipToAddress.asp
12/09/2002  12:47p             1,119 i_ShipToAdressHeader.asp
01/03/2003  03:04p    <DIR>          xsl
        26 File(s)        30,286 bytes
Directory of OrderStar\includes\account\xsl
01/03/2003  03:04p    <DIR>          .
01/03/2003  03:04p    <DIR>          ..
12/09/2002  12:47p            16,793 Account.OrderDetail.xsl
```

-continued

| | | | |
|---|---|---|---|
| 12/09/2002 12:47p | | 16,508 | Account.OrderList.xsl |
| 12/09/2002 12:47p | | 8,337 | Account.ProgrammingInfo.xsl |
| 3 File(s) | | 41,638 bytes | |

Directory of OrderStar\includes\cart

| | | | |
|---|---|---|---|
| 01/03/2003 03:04p | <DIR> | | . |
| 01/03/2003 03:04p | <DIR> | | .. |
| 12/09/2002 12:47p | | 5,497 | i_cart.asp |
| 12/09/2002 12:47p | | 950 | i_cartQuickView.asp |
| 12/09/2002 12:47p | | 494 | i_emptyCart.asp |
| 3 File(s) | | 6,941 bytes | |

Directory of OrderStar\includes\context

| | | | |
|---|---|---|---|
| 01/03/2003 03:04p | <DIR> | | . |
| 01/03/2003 03:04p | <DIR> | | .. |
| 12/09/2002 12:47p | | 908 | i_contextLogonHeader.asp |
| 12/09/2002 12:47p | | 505 | i_forgotPasswordHeader.asp |
| 12/09/2002 12:47p | | 638 | i_preLoginContent.asp |
| 3 File(s) | | 2,051 bytes | |

Directory of OrderStar\includes\dialog

| | | | |
|---|---|---|---|
| 01/03/2003 03:04p | <DIR> | | . |
| 01/03/2003 03:04p | <DIR> | | .. |
| 12/09/2002 12:47p | | 907 | i_dialogOrderStatus.asp |
| 12/09/2002 12:47p | | 712 | i_dialogProductSearch.asp |
| 12/09/2002 12:47p | | 659 | i_legalfooter.asp |
| 12/09/2002 12:47p | | 1,064 | i_postLoginHeader.asp |
| 4 File(s) | | 3,342 bytes | |

Directory of OrderStar\includes\help

| | | | |
|---|---|---|---|
| 01/03/2003 03:04p | <DIR> | | . |
| 01/03/2003 03:04p | <DIR> | | .. |
| 12/09/2002 12:47p | | 1,065 | i_contactusHeader.asp |
| 12/09/2002 12:47p | | 2,019 | i_contactusLanding.asp |
| 12/09/2002 12:47p | | 841 | i_orderstarFAQ.asp |
| 12/09/2002 12:47p | | 1,118 | i_orderstarFAQHeader.asp |
| 12/09/2002 12:47p | | 499 | i_orderstarUpdateBrowser.asp |
| 12/09/2002 12:47p | | 283 | i_salesmap.asp |
| 12/09/2002 12:47p | | 1,123 | i_salesmapHeader.asp |
| 12/09/2002 12:47p | | 825 | i_success.asp |
| 12/09/2002 12:47p | | 776 | map.js |
| 9 File(s) | | 8,549 bytes | |

Directory of OrderStar\includes\js

| | | | |
|---|---|---|---|
| 01/03/2003 03:04p | <DIR> | | . |
| 01/03/2003 03:04p | <DIR> | | .. |
| 12/09/2002 12:47p | | 545 | browser.js |
| 12/09/2002 12:47p | | 1,046 | dhtml.js |
| 12/09/2002 12:47p | | 4,285 | treeView.js |
| 3 File(s) | | 5,876 bytes | |

Directory of OrderStar\includes\legal

| | | | |
|---|---|---|---|
| 01/03/2003 03:04p | <DIR> | | . |
| 01/03/2003 03:04p | <DIR> | | .. |
| 12/09/2002 12:47p | | 642 | i_copyrightSecurity.asp |
| 12/09/2002 12:47p | | 1,007 | i_copyrightSecurityHeader.asp |
| 12/09/2002 12:47p | | 878 | i_privacySecurity.asp |
| 12/09/2002 12:47p | | 1,002 | i_privacySecurityHeader.asp |
| 12/09/2002 12:47p | | 6,000 | i_termsOfSale.asp |
| 12/09/2002 12:47p | | 1,253 | i_termsOfUse.asp |
| 12/09/2002 12:47p | | 1,012 | i_termsOfUseHeaderasp |
| 7 File(s) | | 11,794 bytes | |

Directory of OrderStar\includes\navigation

| | | | |
|---|---|---|---|
| 01/03/2003 03:04p | <DIR> | | . |
| 01/03/2003 03:04p | <DIR> | | .. |
| 12/09/2002 12:47p | | 449 | i_defaultNavigation.asp |
| 12/09/2002 12:47p | | 952 | i_footer.asp |
| 12/09/2002 12:47p | | 1,137 | i_footerBar.asp |
| 12/09/2002 12:47p | | 267 | i_navigationCatalog.asp |
| 12/09/2002 12:47p | | 686 | i_titleBar.asp |
| 5 File(s) | | 3,491 bytes | |

Directory of OrderStar\includes\newFeatures

| | | | |
|---|---|---|---|
| 01/03/2003 03:04p | <DIR> | | . |
| 01/03/2003 03:04p | <DIR> | | .. |
| 12/09/2002 12:47p | | 912 | i_newsHeader.asp |
| 1 File(s) | | 912 bytes | |

Directory of OrderStar\includes\order

| | | | |
|---|---|---|---|
| 01/03/2003 03:04p | <DIR> | | . |
| 01/03/2003 03:04p | <DIR> | | .. |
| 12/09/2002 12:47p | | 904 | i_Announcements.asp |
| 12/09/2002 12:47p | | 726 | i_OrderForm.asp |
| 12/09/2002 12:47p | | 3,868 | i_OrderReview.asp |
| 12/09/2002 12:47p | | 1,118 | i_OrderSubnnitasp |
| 12/09/2002 12:47p | | 334 | i_ShippingChart.asp |

-continued

| | | |
|---|---|---|
| 12/09/2002 12:47p | 416 | i_ShipToAddress.asp |
| 12/30/2002 10:34a | 364 | i_Summary.asp |
| 7 File(s) | 7,730 bytes | |

Directory of OrderStar\includes\product

| | | |
|---|---|---|
| 01/03/2003 03:04p | <DIR> | . |
| 01/03/2003 03:04p | <DIR> | .. |
| 12/09/2002 12:47p | 1,067 | i_advancedSearch.asp |
| 12/09/2002 12:47p | 1,078 | i_advancedSearchHeader.asp |
| 12/09/2002 12:47p | 705 | i_Announcements.asp |
| 12/09/2002 12:47p | 2,860 | i_associatedItems.asp |
| 12/09/2002 12:47p | 2,861 | i_myCustomCatalog.asp |
| 12/09/2002 12:47p | 832 | i_myCustomCatalogHeader.asp |
| 12/09/2002 12:47p | 1,207 | i_productDetailContent.asp |
| 12/09/2002 12:47p | 832 | i_productDetailHeader.asp |
| 12/09/2002 12:47p | 4,742 | i_productListingContent.asp |
| 12/09/2002 12:47p | 751 | i_productListingHeader.asp |
| 12/09/2002 12:47p | 1,696 | i_productNavigation.asp |
| 12/09/2002 12:47p | 1,045 | i_productRelatedItemList.asp |
| 12/09/2002 12:47p | 923 | i_productsHeader.asp |
| 12/09/2002 12:47p | 688 | i_selectCatalogContent.asp |
| 12/09/2002 12:47p | 849 | i_selectCatalogHeader.asp |
| 12/09/2002 12:47p | 743 | i_selectCategoryContent.asp |
| 12/09/2002 12:47p | 862 | i_selectCategoryHeader.asp |
| 12/09/2002 12:47p | 691 | i_selectSubCategoryContent.asp |
| 12/09/2002 12:47p | 871 | i_selectSubCategoryHeader.asp |
| 19 File(s) | 25,303 bytes | |

Directory of OrderStar\includes\targeter

| | | |
|---|---|---|
| 01/03/2003 03:04p | <DIR> | . |
| 01/03/2003 03:04p | <DIR> | .. |
| 12/09/2002 12:47p | 1,162 | i_bannerMessages.asp |
| 12/09/2002 12:47p | 1,086 | i_majorMessages.asp |
| 12/09/2002 12:47p | 987 | i_miniMessages.asp |
| 3 File(s) | 3,235 bytes | |

Directory of OrderStar\legal

| | | |
|---|---|---|
| 01/03/2003 03:04p | <DIR> | . |
| 01/03/2003 03:04p | <DIR> | .. |
| 12/09/2002 12:47p | 2,807 | copyrightSecurity.asp |
| 12/09/2002 12:47p | 2,673 | privacySecurity.asp |
| 12/09/2002 12:47p | 2,782 | termsOfUse.asp |
| 3 File(s) | 8,262 bytes | |

Directory of OrderStar\menus

| | | |
|---|---|---|
| 01/03/2003 03:04p | <DIR> | . |
| 01/03/2003 03:04p | <DIR> | .. |
| 01/03/2003 03:04p | <DIR> | cricket |
| 12/09/2002 12:47p | 4,789 | custom.js |
| 01/03/2003 03:04p | <DIR> | kyocera |
| 12/09/2002 12:47p | 474 | menu.js |
| 12/09/2002 12:47p | 14,173 | menu_ie.js |
| 12/09/2002 12:47p | 15,762 | menu_ns4.js |
| 12/09/2002 12:47p | 13,091 | menu_ns6.js |
| 12/09/2002 12:47p | 12,826 | menu_op5.js |
| 12/09/2002 12:47p | 5,030 | sniffer.js |
| 12/09/2002 12:47p | 4,517 | snifferl.js |
| 12/09/2002 12:47p | 2,287 | style.js |
| 01/03/2003 03:04p | <DIR> | us |
| 9 File(s) | 72,949 bytes | |

Directory of OrderStar\menus\cricket

| | | |
|---|---|---|
| 01/03/2003 03:04p | <DIR> | . |
| 01/03/2003 03:04p | <DIR> | .. |
| 12/09/2002 12:47p | 4,813 | custom.js |
| 1 File(s) | 4,813 bytes | |

Directory of OrderStar\menus\kyocera

| | | |
|---|---|---|
| 01/03/2003 03:04p | <DIR> | . |
| 01/03/2003 03:04p | <DIR> | .. |
| 12/09/2002 12:47p | 4,791 | custom.js |
| 1 File(s) | 4,791 bytes | |

Directory of OrderStar\menus\us

| | | |
|---|---|---|
| 01/03/2003 03:04p | <DIR> | . |
| 01/03/2003 03:04p | <DIR> | .. |
| 12/09/2002 12:47p | 4,789 | custom.js |
| 1 File(s) | 4,789 bytes | |

Directory of OrderStar\newFeatures

| | | |
|---|---|---|
| 01/03/2003 03:04p | <DIR> | . |
| 01/03/2003 03:04p | <DIR> | .. |
| 12/17/2002 09:33a | 3,390 | newsLanding.asp |
| 1 File(s) | 3,390 bytes | |

Directory of OrderStar\order

| | | |
|---|---|---|
| 01/03/2003 03:04p | <DIR> | . |
| 01/03/2003 03:04p | <DIR> | .. |

-continued

| | | |
|---|---|---|
| 12/09/2002 12:47p | 2,583 | Announcements.asp |
| 12/09/2002 12:47p | 2,350 | OrderForm.asp |
| 12/09/2002 12:47p | 2,520 | OrderReview.asp |
| 12/09/2002 12:47p | 2,460 | OrderSubmit.asp |
| 12/09/2002 12:47p | 1,743 | process.asp |
| 12/09/2002 12:47p | 1,394 | ShippingChart.asp |
| 12/09/2002 12:47p | 1,303 | ShipToAddress.asp |
| 12/09/2002 12:47p | 1,754 | termsOfSale.asp |
| 8 File(s) | 16,107 bytes | |
| Directory of OrderStar\product | | |
| 01/03/2003 03:04p | <DIR> | . |
| 01/03/2003 03:04p | <DIR> | .. |
| 12/17/2002 09:32a | 1,519 | Announcements.asp |
| 12/17/2002 09:32a | 2,250 | AssociatedItems.asp |
| 12/17/2002 09:32a | 6,011 | productMenu.asp |
| 12/17/2002 09:32a | 4,854 | products.asp |
| 12/09/2002 12:47p | 6,805 | xt_processAddItem,asp |
| 5 File(s) | 21,439 bytes | |
| Directory of OrderStar\xmlUtilities | | |
| 01/03/2003 03:04p | <DIR> | . |
| 01/03/2003 03:04p | <DIR> | .. |
| 12/09/2002 12:47p | 4,434 | transform.asp |
| 1 File(s) | 4,434 bytes | |
| Total Files Listed: | | |
| 482 File(s) | 2,270,042 bytes | |
| 182 Dir(s) | 1,387,745,280 bytes free | |

FIELD OF THE INVENTION

The present invention relates to a distribution channel for wireless devices and services. More specifically, the present invention relates to a web-based system and method for the management of such a distribution channel that includes a plurality of dealer agents, wireless device manufacturers and service providers.

BACKGROUND OF THE INVENTION

Businesses supplying wireless products and services to customers typically maintain various distribution channels for the fulfillment of product and service sales and orders. The wireless devices, e.g. handsets, pagers, internet access devices, wireless email devices, and the like, are generally provided by a manufacturing concern, whereas the wireless services, i.e. the actual sending and receiving of radio or other high frequency transmissions for telecommunication with or between the wireless devices, are provided by a wireless service provider or carrier. The end customer, i.e. the ultimate purchaser or user, needs to have both a wireless device and a contract for service with a carrier for the device to be operational.

The distribution of wireless devices and services is complicated by the fact that the manufacturer and carrier are usually different, wholly independent enterprises. A wireless device such as a telephone handset is associated with a unique identifier, such as an electronic serial number (ESN), usually assigned by the device manufacturer. A second unique identifier, such as a telephone number or mobile identification number (MIN), is assigned by the carrier for use in connection with the handset. The MIN is programmed or otherwise loaded into a memory of the handset, either at the distribution center or at the retail outlet. The carrier uses the ESN and the MIN to activate the wireless device for recognition by the carrier's wireless system. The carrier must assign the MIN, and must also enter the manufacturer's ESN of the wireless device into its database so that the switching hardware recognizes transmissions from/to the device as authorized.

A common distribution channel for wireless devices involves distribution centers and independent or third-party dealer agents, such as, for example, large retailers including specialty stores, discounters, office superstores and mass marketers, master dealers and their respective sub-dealers, and independent dealer agents, and the like. Carriers rely on these indirect retailers who ultimately interface is with the customer in retail outlets, by telephone, mail, fax, Internet, e-commerce or other retail interface, to acquire new service subscribers. This indirect channel can account for as much as 45 percent of overall activations.

Wireless handset manufacturers may produce various models and brands of handsets for different wireless operating systems or protocols. The handsets are typically procured, stored, and kitted for shipment in a distribution or fulfillment center. The handsets and kits can be sent to the dealer agents to replenish in-store stocks, or can be shipped directly to an end customer who has already ordered the phone and signed a service contract with a carrier.

The customer purchases these wireless devices and accessories, as well as carrier services through a retail interface such as a retail outlet, or by telephone, facsimile transmission, mail order, internet, other e-commerce and so on. The retail interface may involve carrier store operations and/or third parties such as dealer agents, who operate the retail outlet, or, in the case of telephone, facsimile, mail order, Internet ordering, or other e-commerce, an order processing facility.

Regardless of the product fulfillment method, the relationship between the wireless telecommunication customer and the carrier of wireless services starts with a service contract. The service contract enables the customer's wireless equipment to access a wireless transmission system, enabling the customer to send and receive calls, for example. The service contract also enables the carrier to bill and collect fees for use of the wireless system by the customer.

There are a number of costs borne by the carrier to establish and maintain wireless customers or service subscribers through the dealer agent channel. These include "costs of acquisition" such as commissions, rebates, so-called sales-performance-incentives-for-free or "SPFF's" and other handset subsidies paid to the dealer agents; advertising and promotional expenses; the expense of administration and management of the dealer agents; and so on. Typically, the dealer agent is paid a commission for each activation added to the carrier's service, which can be a flat fee depending on the number of activations or it can take the form of a residual tied to usage or billing for the customer. Handset subsidies can include rebates paid to the customer (and sometimes assigned to the dealer agent), SPFF's paid to dealer agents, or can be discounted prices for handsets sold to the carrier's new customers. A carrier does not have a convenient way of ensuring that subsidized product is used in its service network.

The task of communicating current rate plans, credit requirements and service contracts to each of many dealer agents in a timely fashion can be expensive. There are also costs of servicing the dealer agent channel, such as product warehousing; product returns and other "reverse logistics"; transportation and shipping; order management; commission management; cooperative advertising and marketing management; and the like. In the prior art, these costs are high because most systems are inefficient, and even in the case of automated systems for specific functions or tasks, they are not integrated. For example, most orders are received by phone or fax, and commission management is not done as a part of activation, but is based on separate reports. Even where software is available, the dealer agent typically is required to use separate software applications for the various different business processes associated with the operation of a wireless retail outlet.

The dealer agents are similarly not satisfied with the performance of the prior art distribution channel. Commission calculations by the carriers are frequently inaccurate and payments delayed. Inventory is frequently characterized by insufficient product that is in demand, and excess product that sells too slowly; there is not a satisfactory way to get exactly the right product mix into the store, i.e. there is no good market forecasting tool available to the dealer agents. Too frequently, opportunities for potential cooperative advertising revenues are missed. The life of many dealer agents can also be complicated by offering wireless service by more than one carrier and/or obtaining products from more than one distribution center, so that the in-store procedures are different for each carrier and/or distributor.

As a result of the fragmented and chaotic dealer agent distribution channel characterized by the prior art, it is difficult for carriers to gather and take advantage of point of sale information for spotting market trends, determining marketing demographics or sales forecasting. Roughly 80 percent of the dealer agents have 5 or less points of sale. Moreover, such data are limited to the carrier's own activations and do not include those of other carriers, and may not include all products purchased by the customer. It is even more difficult for the wireless device manufacturers to forecast market trends or determine purchaser demographics because they usually receive only limited or no point of sale information; the manufacturers typically learn of sales only by geographic region.

There exists, therefore, a need for a method and system for managing the dealer agent distribution channel that overcomes the disadvantages of the prior art.

SUMMARY OF THE INVENTION

The present invention is a method and system for efficiently managing the dealer agent channel for distribution of wireless devices and services. The invention uses a single website for dealer agents to place wireless device and accessory orders, participate in cooperative advertising programs, process commission payments, perform customer credit scoring and activation, and the like. The invention is particularly applicable when a plurality of dealer agents are involved for a particular carrier, and can also be used by dealers who provide activations for more than one carrier. The invention is also applicable for dealer agents who order products from more than one distribution center.

The system is preferably web-based and can include a presentation layer for a plurality of wireless dealer agents to interface and exchange data with a plurality of software modules for performing various business functions associated with the sale of wireless devices and services, and a content management and delivery module for at least one carrier to interface and exchange data via the function integrators. The wireless business function software includes modules for product ordering, activation and credit scoring, and commissions management, and can, if desired, also include modules for coop management, product and service management, report generation and other wireless business functions.

The present system and method can provide for efficiently supporting a highly fragmented indirect channel, maximize activations for the carrier while minimizing support costs, and turn acquisition and management costs across channels into a single controllable cost. In contrast, the direct channel company-owned stores have fixed costs. The invention can also simplify management and control of product offerings and selling strategies that can vary significantly across distribution channels and geographic areas. For the dealer agents, the invention can reduce the time spent interfacing with the carrier, ensure product availability, facilitate and automate product forecasting and ordering, and speed up receipt of activation revenue.

In one embodiment, the present invention provides a system for managing a wireless device and service distribution channel, comprising a product ordering software module integrated with an activation and credit scoring software module, and a commissions management software module, and these software modules can, if desired, also be integrated with software modules for coop management, product and service management, report generation and other wireless business functions. The system also includes a web-based interface between the software modules and a plurality of geographically distributed dealer agents who operate retail interfaces with customers for the sale of wireless devices and subscription services. The system has a data link with one or more distribution centers, preferably more than one distribution center, for delivery of wireless devices from a plurality of wireless device manufacturers in accordance with orders processed by the product ordering software module. The system further includes an interface between the software modules and a plurality of carriers providing the subscription services activated for the customers via the activation and credit scoring software module. One or more of the dealer agents are authorized agents for the sale of the subscription services by at least two of the carriers.

In another preferred embodiment, the system comprises a plurality of wireless dealer agents, at least one wireless carrier and at least one distribution center. A web-based presentation layer is provided for interfacing and exchanging data with the dealer agents and carrier(s). A communication layer interfaces and exchanges data between the presentation layer and wireless business function modules, including at least product ordering, activation and credit scoring, commissions management, coop management, and content management and delivery, and can, if desired, also include modules for product and service management, report generation, metrics gathering and other wireless business functions. Each of the wireless business function modules has access to a distribution channel database for the storage and retrieval of data used by the modules. There is a data link provided between the product ordering module and the product distribution center(s). If desired, a data-mining engine can be provided for selecting data from the database for the report generation module.

The method of one embodiment comprises the steps of:
(a) establishing interfaces between distribution channel manager software and a plurality of wireless dealer agents for at least one carrier, the software comprising a presentation layer for the exchange of data with the dealer agents, wherein the presentation layer is operatively coupled with business function software modules comprising a product ordering module, activation and credit scoring module, and commissions management module, and can, if desired, also comprise software modules for coop management, product and service management, report generation and other wireless business functions;
(b) operating the product ordering module to process orders placed by the dealer agents via the presentation layer for inventory replenishment and arrange for delivery of wireless products from at least one distribution center to the respective dealer agents;
(c) operating the activation and credit scoring module to perform credit scoring on customers based on data entered via the presentation layer, to receive confirmation or conditions from the at least one carrier for the establishment of wireless service for the customers, and to activate wireless devices to establish the customers as subscribers of the at least one carrier;
(d) operating the commissions management module to calculate commission payments to each dealer agent by the at least one carrier based on the activations from step (c) that are validated and any charge backs applicable to the respective dealer agent;
(e) if present, operating the coop management module to develop marketing concepts for each dealer agent; develop advertising copy and design based on the concepts, arrange for approval of the copy and design by the at least one carrier, and receive a coop payment from the carrier on behalf of the dealer agent;
(f) operatively establishing an interface between the at least one carrier and a content management and delivery module of the channel management software for receiving wireless marketing program information from the at least one carrier for use in the dealer agent interfaces in step (a), the product ordering operation of step (b), the activation and credit scoring operation of step (c), the commissions management operation of step (d), where present the coop management of step (e), or a combination thereof.

The channel management software used in the method preferably includes a communication layer for exchanging data between the presentation layer and a channel management database. The interface with the at least one carrier is preferably via the presentation layer, and the interface of the content management and delivery module is preferably via the presentation layer or the communication layer. In step (a) of the method, the user can be profiled at log on using a username and password or other unique identifiers to determine the type of interface to be established (carrier or dealer agent) as well as the software modules, content and database access levels.

The product ordering operation can include forecasting sales for a respective dealer agent based on data entered via the dealer agent interface, ordering wireless handsets and accessories for the respective dealer agent based on the sales forecast, tracking and receiving the orders, reporting on sold product, updating the sales forecast based on sold product, and reconciling activations with ESN's. The wireless marketing program information can include carrier service rate plan information, commission information, rebate information, market directed funding information, sales-performance-incentives-for-free (SPFF) information, collateral material information, training information on wireless products and services, sales tools, and the like. The method can interface with multiple carriers, wherein one or more of the dealer agents are authorized for activations with more than one carrier. Similarly, the method can place wireless product orders with more than one distribution center, e.g. a distribution center of the channel manager, the carrier, the manufacturer, a third party distributor, or the like.

In one preferred embodiment of the method, point of sale information is captured during the activation and credit scoring operation of step (c) and stored in the channel management database. The point of sale information can be used in sales forecasting or other software modules. The channel management software can also include a business report generation module. The point of sale information can also be mined for metrics reporting to the carrier(s), manufacturer(s) or other third party.

BRIEF DESCRIPTION OF THE DRAWINGS

FIG. A is a schematic diagram of the relationship between the dealer agents, carriers, manufacturers, and distribution centers using one embodiment of the channel management software of the present invention.

FIGS. 9-19 are screen displays for an ordering module presentation interface according to one embodiment of the invention.

FIGS. 20-23 are screen displays for a content management module presentation interface according to one embodiment of the invention.

DESCRIPTION OF THE INVENTION

In the following description of the method and system of wireless distribution channel management, the invention is described as being used to distribute wireless handsets. The present invention is not, however, restricted to handsets. Those skilled in the art will recognize that the present invention may be used to advantage for the distribution of any number of wireless devices that must be activated for service, as well as accessories related to the wireless devices such as cases, mounting hardware, antennas, remote listening and speaking devices, power supplies, battery chargers and the like. For example, the present invention can be used to advantage for the distribution of wireless pagers, wireless Internet access devices, wireless email devices, satellite television and radio receivers, and various wireless remotes. However, for purposes of illustration and clarity, and not for limitation, the present invention will be described with reference to the distribution of wireless handsets.

With reference to Fig. A, there is schematically shown the general flow of goods and information between the dealer agents A, the manufacturers B, and the carriers C in accordance with the principles of one embodiment of the present invention. The dealer agents A and the carriers C interface with web-based presentation layer D, which is in communication with server E. The channel management software F is resident on the server E and is in communication with database G for the storage and retrieval of channel management data. The channel management software F facilitates the business processes that involve the sharing of information between the dealer agents A and the carriers C, who effectively communicate and conduct transactions with each other via the presentation layer D and the channel management software F. The distribution center(s) H keep an inventory of products from the manufacturer(s) B. The channel management software F communicates ordering information with the distribution center(s) H via a data link so that products are shipped from the respective distribution center H to the dealer agents A in accordance with the ordering information.

Figure 1:
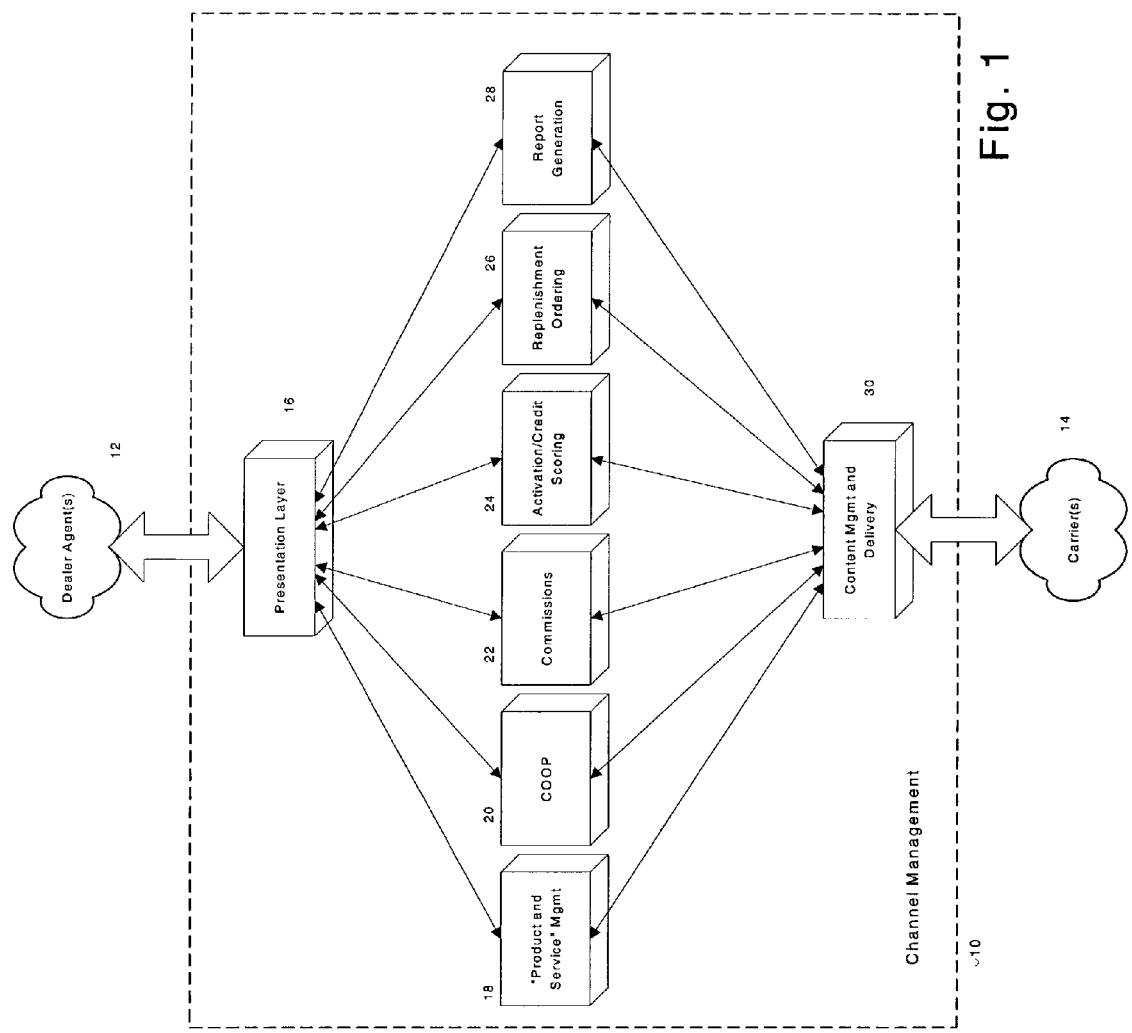
FIG. 1 is a schematic diagram of one embodiment of the channel management system according to the principles of the present invention.

With reference to FIG. 1, the channel management system 10 according to the present invention provides a convenient platform for effecting most of the business processes of the dealer agents 12 that require the sharing of information with the carrier(s) 14. The channel management system 10 includes a web-based presentation layer 16 for interfacing and exchanging data with the dealer agents 12. The presentation layer 16 is preferably a graphical user interface (GUI) comprising one or more screens or pages viewable from a computer monitor or other display device and enabled by activating a web browser program. The presentation layer 16 can be customized or dealer agent-specific for private labels or brands.

Various software modules 18, 20, 22, 24, 26, 28 in the channel management system 10 facilitate the business processes involving the carrier(s) 14. The module 18 provides product and service management such as the communication of carrier service rate plans, wireless devices compatible with the carrier's system operating protocol, and pricing for products and services.

The coop module 20 manages the content, placement and payment for shared advertising and promotions, such as market-directed funding provided by the carrier 14. The coop module 20 uses a coop account established for each of the dealer agents 12, and with each purchase of products designated as having a coop available, the respective dealer agent coop account is credited. For example, the module 20 can use a table data structure to support product-coop relationships.

This allows the dealer agents 12 to take advantage of additional coop funding from original equipment manufacturers (OEM's) that might not otherwise be available when the products are purchased from the carrier 14 or outside the channel management system. The account can also be credited whenever the carriers 14 make coop payments. The module 20 is preferably a web-based or web-accessible program that provides the dealer agents 12 with online access to their respective accounts. The dealer agents 12 can send in scanned advertising copy for approval and payment via the module 20. The module 20 can also include an ad maker tool that allows the dealer agents 12 to create custom ads for the local level, and to create direct mail campaigns. The module 20 can also provide means for supplying the dealer agents 12 with OEM-branded collateral merchandise, for example, t-shirts, mugs, pens and so on.

The commissions module 22 can track commissions payable by the carriers 14 to the dealer agents 12 based on activations, for example, or other sales data captured via the presentation layer 16.

The credit scoring and activation module 24 receives credit information for a prospective wireless service subscriber, runs a credit check and/or scoring according to the rules established for the particular carrier 14, confirms credit approval (or reports conditions of service to the dealer agent 12), and activates the subscriber, e.g. by reporting ESN, MIN and customer data to the carrier 14.

Figure 3:
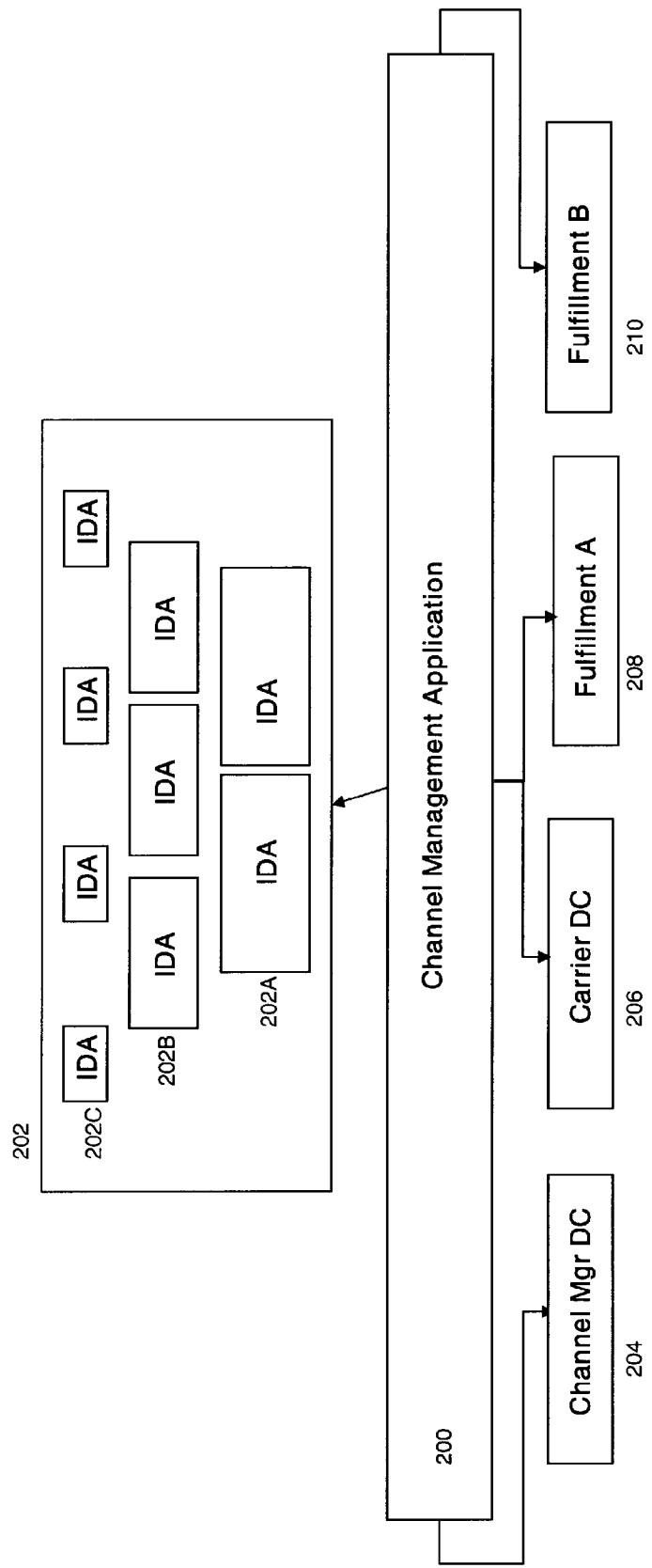
FIG. 3 is a schematic diagram of the relationship between the dealer agents, the channel manager, and the distribution centers according to one embodiment of the present invention.

The ordering module 26 allows the dealer agents 12 to order stock via the presentation layer 16, and arranges for order fulfillment by a distribution center (see FIG. 3). The ordering module 26 can also include order status tracking and inventory management functions.

The ordering module 26 preferably includes an online credit application that automatically provides the dealer agents 12 with credit or additional credit, and an information screen that informs the dealer agents 12 of their credit limits and availability. Credit limits for the respective dealer agent 12 can be adjusted based on activations, accrued commissions, accrued coop funding, or other sales as indicated in the modules 20, 22 and 24, for example, particularly where the dealer agent 12 has given a security assignment of such proceeds to the channel manager to and/or distribution center. The module 26 preferably includes multiple payment options, such as, for example, credit card, collect-on-delivery (COD), invoicing, electronic check, wire transfer, coop account balance transfer, or the like. For electronic check payment, the module 26 can include a data link with an online check processor. For wire transfer, the module 26 can include a data link to capture is wire transfer numbers, means for temporarily holding the orders until the wire transfer is completed, means for wire transfer execution, and means for sending an email or other electronic confirmation of order acceptance or denial. Where credit is extended to the dealer agent 12, the module 26 should also preferably include credit hold and release features in the event the dealer agent 12 is not entitled to credit, e.g. due to payment history. The credit hold is communicated to the respective dealer agent 12 upon entry from the home page, during the checkout process, or by email or other electronic communication, and depending on the type of credit hold can be released via a user interface comprising one or more web screens and/or pages.

Volume pricing discounts can be offered to the dealer agents 12 by catalog, with the ability to set and show prices available to the dealer agents 12 within different catalogs or another type of user interface. Volume discounts can be on a per transaction basis or total monthly or other time period purchases. The module 26 can also use a volume pricing rule determined by carrier partners, i.e. handset and accessory manufacturers.

The module 26 can also provide for the ordering of associated marketing materials, e.g. banners, posters, point of sale (POS) displays, and other collateral sales items, especially for accessories and handset-accessory bundles. The module 26 can include a special offer landing page; shopping cart, add to shopping cart and check out features; and a special offer managing tool. For handset-accessory combinations, the module 26 preferably includes bundle definition rules, shopping cart display characteristics, accounting treatment methodologies, a database definition table or XML form that controls the setting of bundles, a bundle management tool, and the like.

The module 28 generates routine or custom reports based on the activities in the other modules. For example, activations by ESN is a common report generated from data captured from the activations module 24, and has considerable utility in the commissions module 22 where these payments are based on a fee for activations. Other reports generated by module 28 can include purchase history for is phones and accessories, aging of accounts payable, summary of returns and credits to account, and so on.

These modules are commercially available, similar modules are available that can be readily adapted for use in the present invention by the ordinarily skilled programmer, and/or the software for performing the functions of the modules can be developed by the ordinarily skilled programmer. For example, ordering software for module 26 is known under the trade designations ORDERSTAR® (see the computer program listing appendix) and CELLSTAR AOS 4.0; and report generating software for module 28 is known under the trade designation CELLSTAR NETXTREME® (see the computer program listing appendix). Many carriers already have activation and credit scoring software that can be readily adapted for use in the channel management system 10, and others are commercially available, e.g. from GetConnected Inc. Coop management software is available, for example, from Advanced Advertising Services.

This channel management system 10 allows each dealer agent 12 to log on to a single website with a username and password protocol to profile the presentation layer 16 and/or other software modules for the particular marketing program applicable to the respective dealer agent 12 and/or carrier 14, recognizing that each of the carriers 14 can have different programs for different dealer agents 12 who have different volumes or geographical locations or service areas. The dealer agent profile limits information to that which is appropriate for the particular dealer agent 12, i.e. one dealer agent 12 will not generally be provided with access to the information of other dealer agents except as authorized by the profile. Moreover, some dealer agents 12 may be authorized agents of more than one of the carriers 14; the channel management system 10 allows these multi-carrier dealer agents 12 to interface with multiple carriers via the same presentation layer 16, while at the same time preventing unauthorized viewing of one carrier's information by another. The channel management system 10 thus provides a platform for the private exchange of information between the dealer agents 12 and the carriers 14.

On the other side of the channel management system 10, the carriers 14 can interface a content management and delivery module 30 that is integrated with each of the software modules 18, 20, 24, 26, and 28. This allows each of the carriers 14 to automatically update program information for all or selected ones of its dealer agents 12. For example, changes in subscription plans can be simply posted into the channel management system 10 via the module 30 and each affected dealer agent 12 is automatically updated at log on or otherwise. Similarly, collateral materials for coop advertising can be conveniently distributed to the appropriate dealer agents 12 via the coop module 20.

The content management and delivery module 30 provides the carriers 14 with an online administrator tool to create its own catalog. For example, specific catalogs are assigned to each of the carriers 14. The carriers 14 control the wireless handsets and accessories that are selected for the catalog, and the catalog assigned to the particular carrier 14 is made available to the carrier's dealer agents 12 by login. The catalog preferably associates accessories and aftermarket products with each handset model. The module 30 preferably includes a login screen for the carriers 14 in which the carrier 14 enters a username and password. The module 30 allows the carrier 14 to add new items to the catalog and delete obsolete items.

The module 30 also preferably includes a web-based pricing interface that allows the carrier 14 to set prices used in the ordering module 26. The prices can be set globally or for particular dealer agents 12 or groups or classes of dealer agents 12. The module 30 preferably includes a web-based administrative tool for the carrier 14 to offer rebates, SPFF's or other incentives to the dealer agents 12, again either globally or to specific dealer agents or groups or classes of dealer agents 12.

The carriers 14 are also allowed to login and profile sales via the ordering and reporting modules 26, 28. By providing the carriers with such an interface, the carriers 14 can view all sales to dealer agents within their system and obtain reports on product, ESN, intelligent roaming database (IRDB) and so on by "ship to" or other parameter. Preferably, the system 10 creates carrier profiles and dealer agent profiles, and associates the profiles of the carriers 14 with those of the respective carrier's dealer agents 12. The module 28 can also be configured to generate custom reports for the carriers 14.

Figure 2:
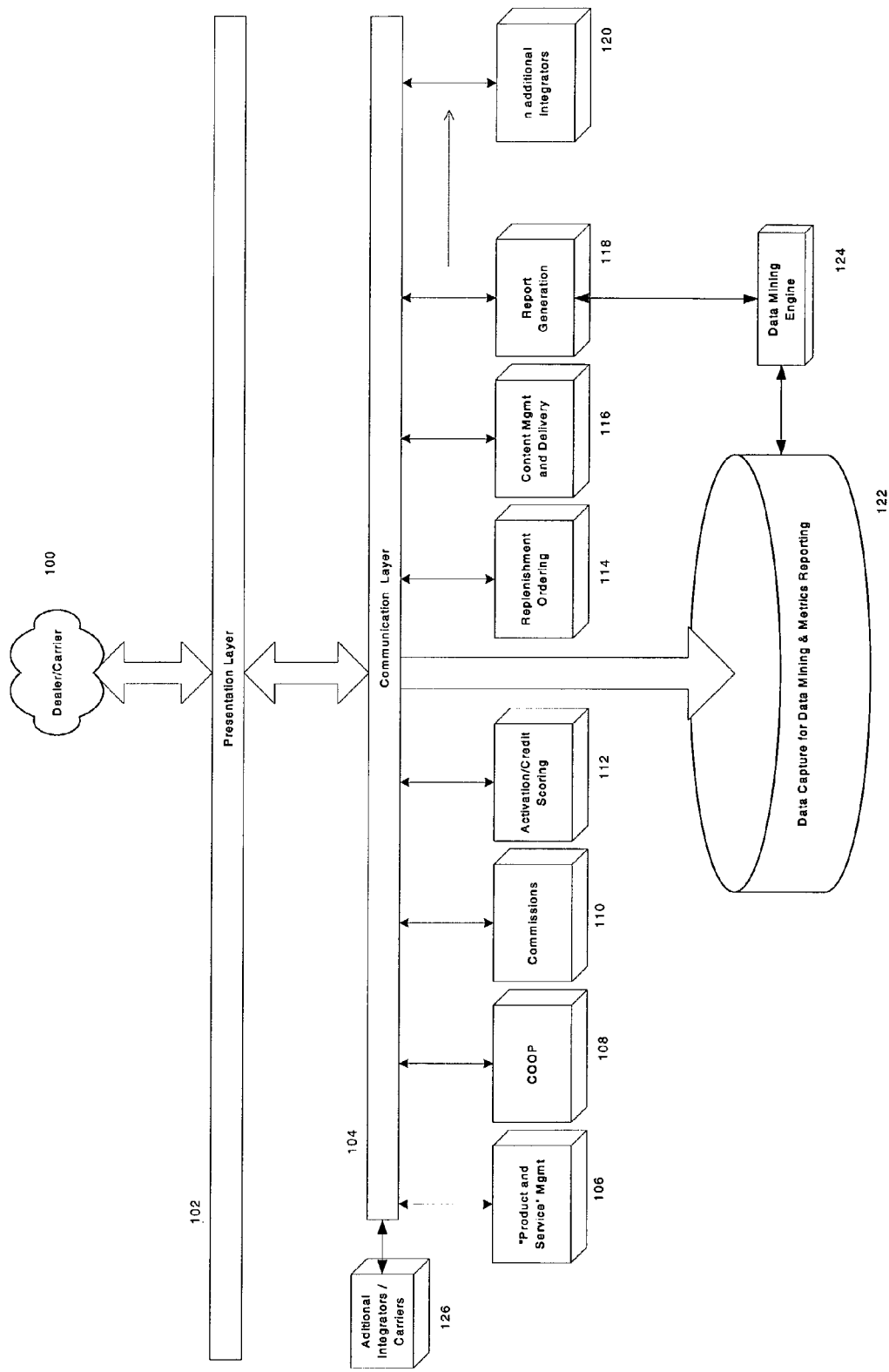
FIG. 2 is a schematic diagram of another embodiment of the channel management system according to the principles of the present invention.

Another embodiment of the invention is shown schematically in FIG. 2 wherein the system users 100 comprise both dealer agents and carriers who exchange data via a presentation layer 102, which can be a single website accessed by both types of users 100. There is a distinct communication layer 104 that then exchanges data between the presentation layer and the various business process software modules 106, 108, 110, 112, 114, 116, 118, 120, as well as database 122. The communication layer 104 also facilitates data exchange between the various software modules 106, 108, 110, 112, 114, 116, 118, 120, and thus serves to integrate them. The modules 106, 108, 110, 112, 114, 118 generally perform the same functions as the modules 18, 20, 22, 24, 26, 28 in the FIG. 1 embodiment; however, the content management and delivery module 116 corresponding to module 30 in the FIG. 1 embodiment is also similarly integrated via the presentation layer 102 and communication layer 104. Additional business process software modules 120 can also, if desired, be integrated into the system via the communication layer 104.

A database 122 is also integrated via the communication layer 104. This allows information gathered during the operation of the software modules 106, 108, 110, 112, 114, 116, 118, and 120, e.g. point of sale information, to be captured. These data can include demographic data, handset and accessory data, plan information, options selected, carrier and the like, and can be used for data mining and metrics reporting, for example, via a data mining engine 124 and report generation module 118. The database 122 can be geographically distributed, for example, the database 122 can include an aggregation of data maintained or provided by participating carriers, manufacturers, other third parties, or the like.

These data, solely from the channel manger and/or aggregated with data from one or more data sharing partners, can be conveniently used in sales forecasting, inventory management, and marketing by the channel manager, the dealer agents, the carriers, the distribution centers, the wireless device manufacturers, market research consultants, and other third parties. Because these data can be based on the data for all dealer agents, carriers and manufacturers participating in the channel management system, they are more representative and is complete than each user's own data would be. Conversely, access to specific data or regions in the database 122 can be limited by rules establishing which data are accessible by user profiles, for example, where different manufacturers desire to keep confidential or proprietary data from other manufacturers or users. Because the channel management system is computerized and integrated, the data are current and can be made available very promptly. For example, sales trends and changing customer demographics can be quickly reported to manufacturers who can then change their marketing strategies and product mix in response. Dealer agents can be promptly alerted to developing demand for certain products. A direct benefit of the channel management system of the present invention is improved efficiencies and reduced costs for the dealer agents, carriers, and distribution centers, and lower prices and improved service and delivery to customers.

FIG. 3 schematically illustrates the operation of the channel management application 200 to manage a plurality of indirect dealer agents 202 and coordinate product fulfillment from various sources. For example, dealer agents 202 authorized by a particular carrier may include one or two large (more than 1000 activations per month) agents 202A, a handful of midsize (100-1000 activations per month) agents 202B, and a relatively large number of small (less than 100 activations per month) agents 202C. Regardless of size, each of the dealer agents 202 uses the channel management application 200 to order wireless devices and accessories from distribution center 204 operated by the channel management software operator, distribution center 206 operated by the carrier, fulfillment center 208 operated by the carrier, and/or distribution/fulfillment center 210, which can be independent of the carrier and channel manager. The distribution/fulfillment centers 204, 206, 208, 210 process the orders and deliver the merchandise to the dealer agents 202 and/or their customers as the case may be. The distribution centers 204, 206, 208, 210 preferably report to the channel management application 200 so that the dealer agents 202 can also determine product availability, track order status and delivery, manage inventory and the like. If desired, the channel manager can by agreement also receive activation revenues from the carriers on behalf of the dealer agents and transfer these funds to the dealer agents, to cover purchases from the distribution centers, or as an offset against accounts payable to the channel manager. Other distribution and/or fulfillment centers (not shown) can also be used to supply merchandise to the dealer agents 202 and/or directly to their customers in the case of fulfillment centers.

Figure 4:
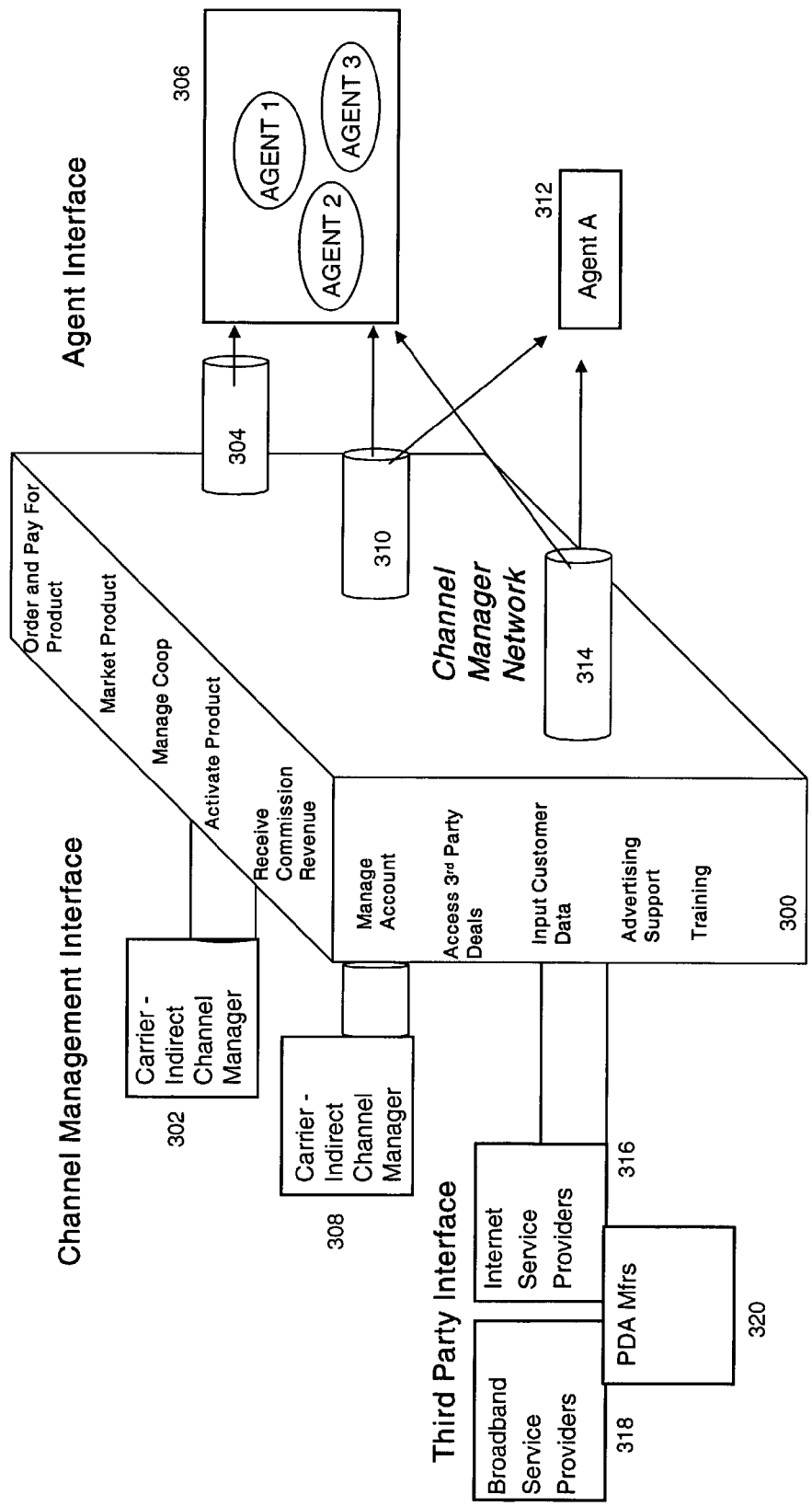
FIG. 4 is a schematic diagram of the concept of a private exchange between the dealer agents and the wireless carriers facilitated by the channel management application according to an embodiment of the present invention.

FIG. 4 is a schematic diagram of the concept of the private exchange of carriers with their dealer base and third parties. The channel manager network 300 provides integrated business software for the wireless market as described above, including ordering and paying for merchandise, marketing, coop management, product activation, commission payment, account management, access third party deals, customer data input, advertising support, training, and the like. Carrier 302 is a first indirect channel manager with a gateway 304 through the network 300 to manage dealer agents 306. Carrier 308 is a second indirect channel manager with a gateway 310 through the network 300 to manage agents 306 and 312. Note that dealer agent 312 is an exclusive dealer agent for carrier 308, whereas dealer agents 306 are authorized to enlist subscribers for both carriers 302 and 308. Another gateway 314 can be provided through the network for the dealer agents 306 and 312 to interface with other third party service/product suppliers, such as, for example, internet service providers 316 (e.g. AOL or MSN), broadband service providers 318 (e.g. GetConnected, Simplexity or Handango), personal digital assistant (PDA) manufacturers 320 (e.g. Nokia, Motorola, Ericsson), and the like. The dealer agents 306, 312 thus have access to third party devices and services, as well as account management, custom catalogs and the like.

Figure 5:
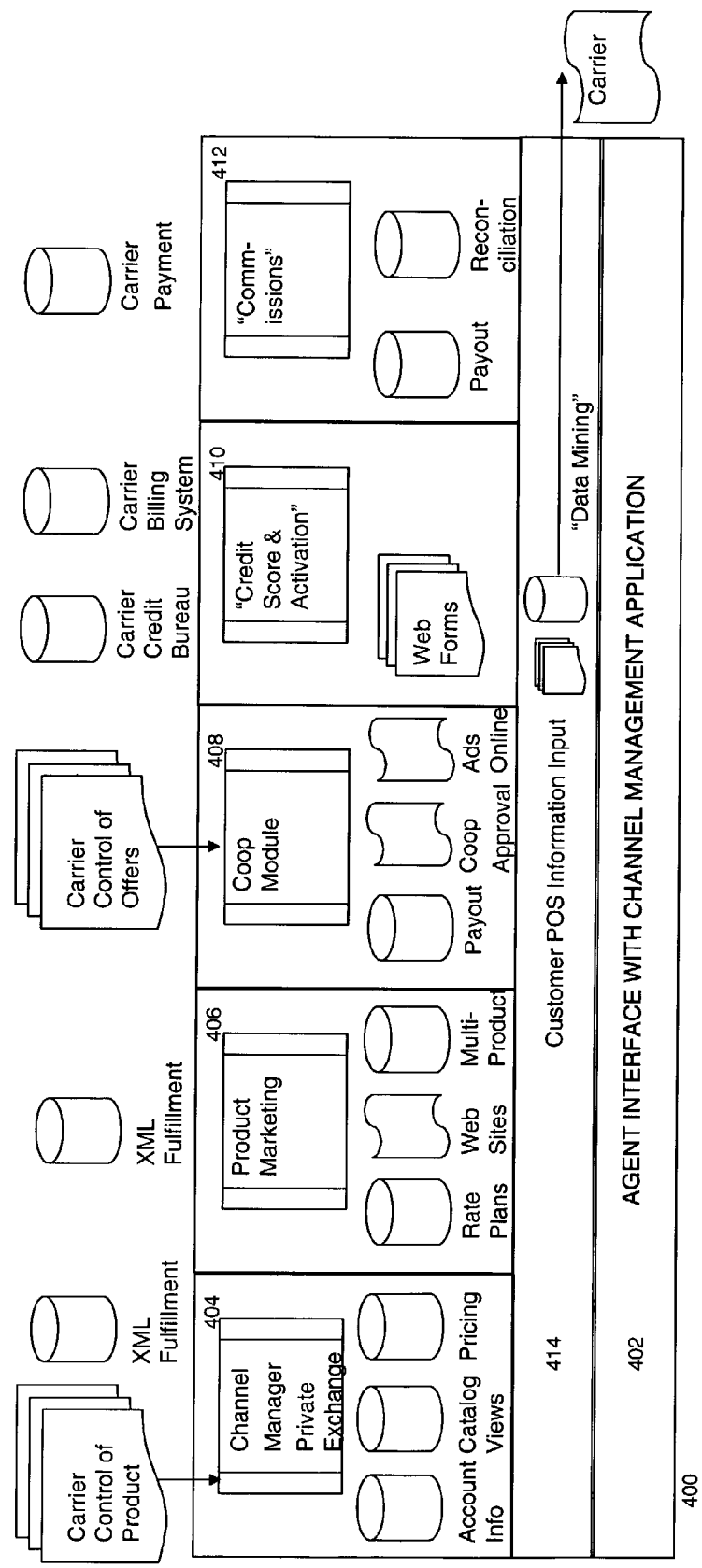
FIG. 5 is a schematic view of the core components of the channel management application according to an embodiment of the present invention.

FIG. 5 schematically illustrates the core components of the channel management system 400, including dealer agent interface 402 linked to various software modules 404, 406, 408, 410 and 412. The interface 402 includes or is operatively linked to a customer point of sale (POS) information input platform 414. The channel management system 400 serves to integrate all of the necessary components of a complete channel management application and expands simple ordering to encompass private exchange functionality between the dealer agents and the carriers.

The private exchange module 404 provides carriers and other indirect is wireless distribution channel managers to uniquely tailor prices and rebates for each dealer agent account within the program. The module 404 can be used to sign up new agents online, as well as manage dealer agent credit applications online. The module 404 offers catalogs and catalog views that are specific to the pertinent carrier; each carrier can control the products listed in the catalogs for its dealer agents, for example, to ensure that the phones sold to its subscribers work properly on the carrier's network system. The module 404 effects fulfillment of orders via data links, preferably extensible markup language (XML) data links and/or simple object access protocol (SOAP) to various distribution centers operated by the carrier, the channel manager, manufacturers, third party logistics suppliers, etc. The module 404 can develop agent profiles by account, region and nationally, and facilitates the monitoring of agent purchasing behaviors. The module 404 desirably creates administrator views so that indirect channel managers within each carrier can view and track sales by geographical region. The module 404 preferably associates the ESN of handsets purchased by each dealer agent so that the information can be used in the activation module 410 to ensure that carrier-subsidized products are used in the subsidizing carrier's service network.

The product marketing module 406 provides additional wireless products and services for sale by the dealer agents through a separate tab and section of the agent interface site 402, enabling each agent to sell broadband, long distance, local exchange, satellite services, and PDA's with wireless telephone services. The product marketing module 406 Can support online sales by the carriers from a carrier's website using a data link, preferably an XML/SOAP data link, to a direct-to-the-consumer fulfillment center for order processing. The module 406 also provides the entire dealer agent base for each carrier with an online source for rate plans and for downloading rate plan alerts, changes, updates and similar information. From to the dealer agents' perspective, they are provided with the means for comparison shopping that can be used to facilitate sales in their stores, and they can also order products that are not in stock in their store, e.g. for fulfillment directly to the purchaser.

The coop module 408 facilitates cooperative advertising submittal, approval and payment process. The module 408 can include tools such as templates to facilitate the development of ads by the dealer agents. For example, prepackaged graphics and ad layouts can be made available to the dealer agents online. The module 408 also provides carriers with discrete control over each dealer agent account, similar to the private exchange module 404. Because coop funding available to each dealer agent is usually directly dependent on the level of product purchasing, the integration of the coop module 408 with the product purchasing functions of the private exchange module 404 simplifies the coop function for both the dealer agent and the carrier.

The credit score and activation module 410 enables dealer agents to log into ordering software and use a separate tab to enter customer data required for activation. With the appropriate data links, the module 410 provides real-time credit scoring with the carrier's credit bureau or using an outside credit agency. The module 410 will allow the dealer agent to enable credit score and activation processes across multiple carriers. The module 410 uses credit failure data to offer alternative products and/or services. An online purchase form associates ESN's, MIN's, customer information and other information required for activation, and automatically enters the associated information into a checkout form. If desired, the module 410 can be integrated with existing online tools of a particular carrier. The subscriber information for each dealer agent is stored and downloadable into the dealer agent's system, while the information is simultaneously captured by the respective carrier for activation. The module 410 can also be used to minimize fraud and reduce churn, i.e. the contemporaneous cancellation of subscription service by a carrier's existing customer and the establishment of a new subscriber account for the customer by the dealer agent.

The commissions module 412 allows dealer agents and carriers to reconcile commission payouts. The carriers can manage payment of commissions to dealer agents using the module 412. The carrier can uniquely structure commissions by agent account or globally. Using the module 412 will allow the dealer agents to receive their commission checks sooner than if the carrier were managing the process. Another advantage is that facilitating the commission reconciliation and payment process allows the channel management enterprise or distribution center(s) to use commission receivables as collateral against bad debt from dealer agent accounts, thereby reducing credit costs and risks.

Figure 6:
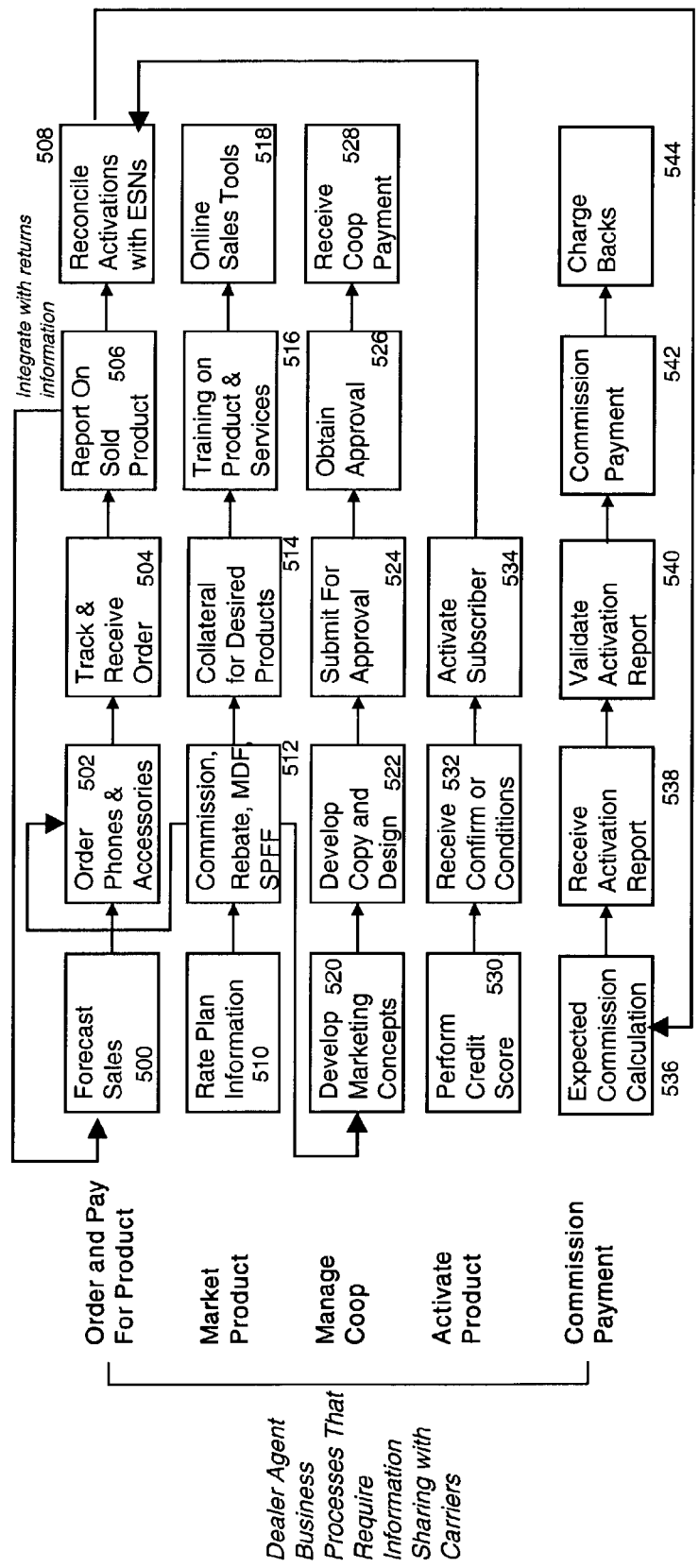
FIG. 6 is a block flow diagram of selected channel management business processes according to an embodiment of the present invention.

FIG. 6 is a block flow diagram of some of the indirect dealer agent business processes according to an embodiment of the present invention. The product order and payment track begins in step 500 with an estimate of product needed using a sales forecast that can be based on recent sales by the dealer agent as well as other tools, including data "mined" by the operation of the channel management system. In step 502, the sales forecast is used to order phones and accessories. The order is received, routed to the appropriate distribution center and tracked in step 504. In step 506, the product sales by the dealer agent are tracked and reported, preferably using a POS data capture platform. If desired, the step 506 can be integrated with information on returns. As mentioned, sales reported in step 506 are used in the sales forecasting step 500. In step 508, the activations are reconciled with the ESN's of the product sold, preferably via the POS data capture platform.

The product marketing track includes the posting by the carrier of rate plan information into the channel management application in step 510, and of commission, rebate market-directed funding and SPFF information in step 512. This information is in turn used in the ordering step 502 by the dealer agent to maximize carrier subsidies and payments and minimize the cost of goods, as well as in coop management as discussed in more detail below. Using the information posted by the carrier in steps 510 and 512, the dealer agent develops collateral or POS materials for the desired products in step 514. In step 516, the dealer agent receives training for store sales personnel on the products and services offered by the dealer agent, and in step 518 the dealer agent uses online sales tools.

In the coop management track, the dealer agent develops marketing concepts in step 520, taking into account the information from steps 510 and 512 as previously mentioned. In step 522, advertisement copy and designs are developed by the dealer agent, and submitted for approval in step 524. Once approval by the carrier or on the carrier's behalf is obtained in step 526, the ads are placed in print, broadcast, or other media, and the coop payment is made in step 528.

In the product activation track, a credit scoring is performed in step 530, the credit approval (or conditions) is received in step 532, and the subscriber is activated in step 534. Reconciliation of ESN's with the subscriber activation is then performed in step 508 as previously mentioned.

In the commission payment track, the expected commissions are calculated in step 536 based on the activation report by ESN from step 508. The activation report is received by the carrier in step 538, validated in step 540, and commissions are paid in step 542, less any charge backs in step 544.

Figure 7:
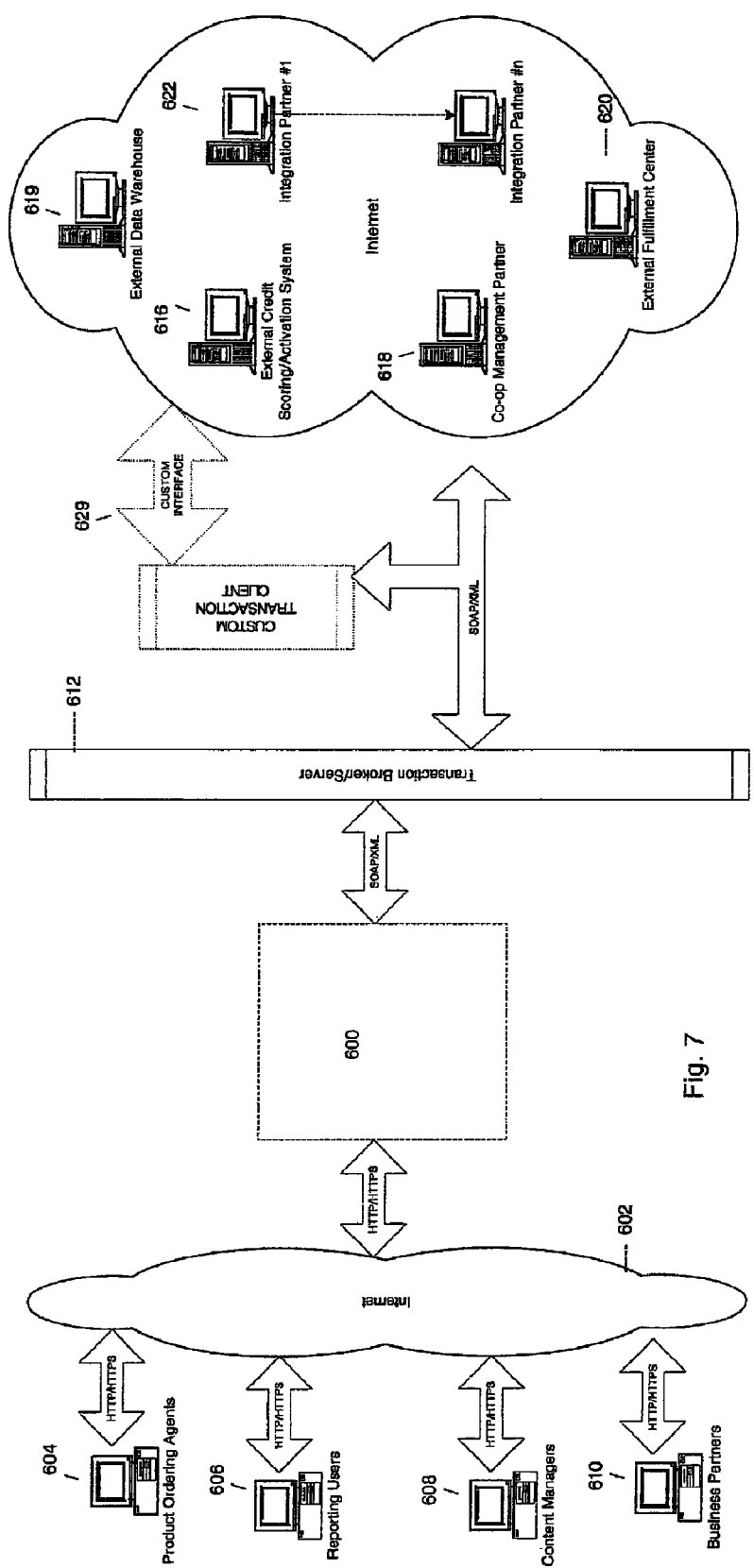
FIG. 7 is a schematic view of channel management application system architecture according to an embodiment of the invention.
Figure 8:
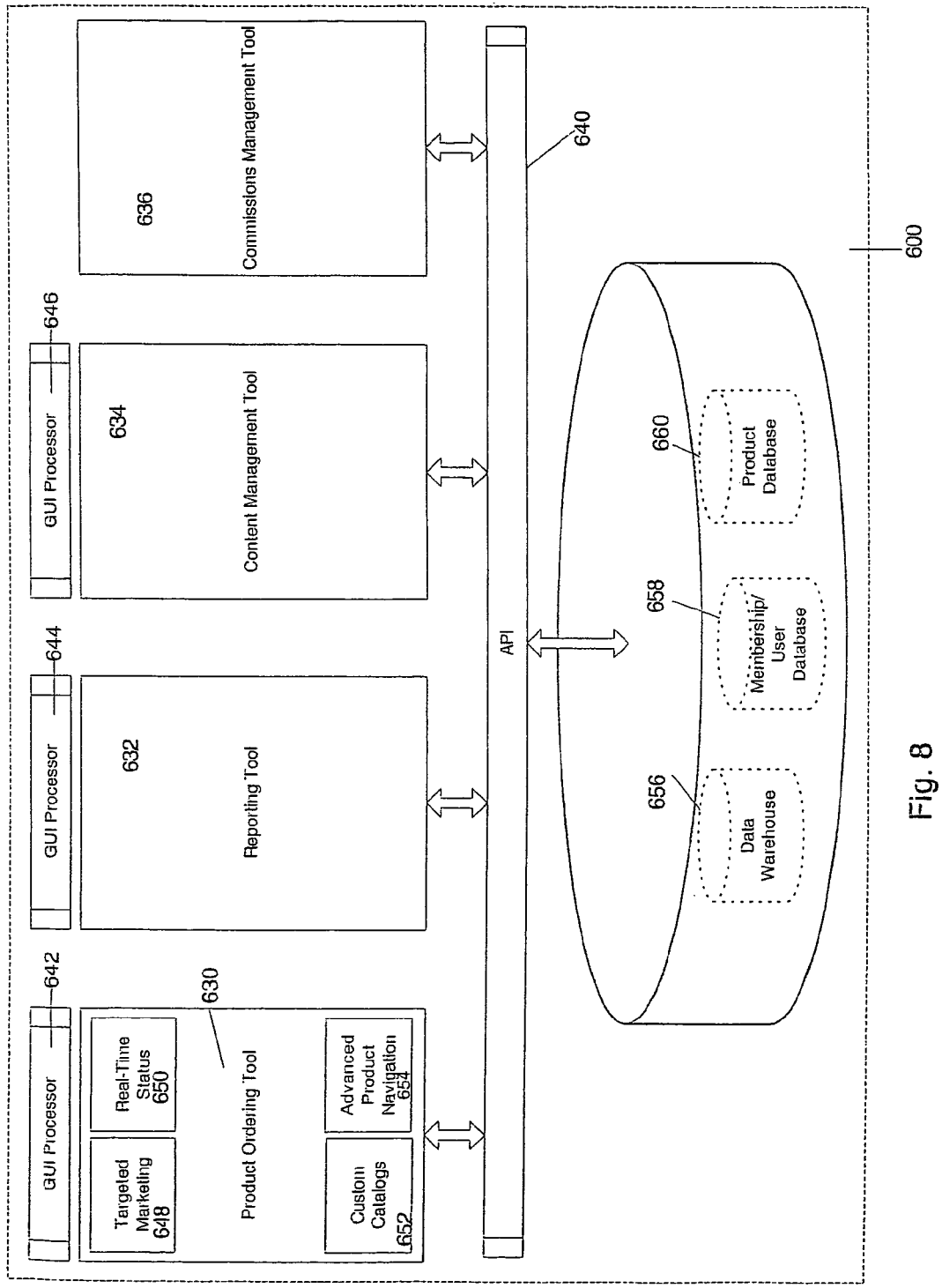
FIG. 8 is a schematic view of the channel management application software of FIG. 7.

FIGS. 7 and 8 show an overview of system architecture for the channel management application according to another embodiment of the invention. The channel management application 600 is linked via the internet 602 for communication via hypertext transfer protocol (http) or secure http (https) with the workstations or servers of the product ordering agents 604, reporting users 606, content managers 608, other business partners 610, and the like. The channel management application 600 is similarly linked via a transaction broker application or server 612 (see the computer program listing appendix for an example) for communication via SOAP, XML or the like with the systems of external data warehouse 614, external credit scoring and/or activation system 616, coop management partner 618, external fulfillment center 620, and additional integration partners 622 such as, for example, distribution centers, data warehouses, product databases, enterprise resource planning systems, including real time pricing capabilities, and the like. Custom interface 624 can be used for interfacing with clients without SOAP/XML capabilities.

The channel management application 600 includes product ordering tool 630 to (see the computer program listing appendix for an example), reporting tool 632 (see the computer program listing appendix for an example), content management tool 634 (see the computer program listing appendix for an example), commissions management tool 636, and channel manager database 638. These tools and the database 638 are associated with an application programming interface 640. The is product ordering tool 630, reporting tool 634, and content management tool 634 can be associated with respective graphical user interface (GUI) processors 642, 644, 646. The product ordering tool 630 can include targeted marketing feature 648, real-time status feature 650, custom catalogs 652, and advanced product navigation feature 654. Enterprise database 638 can include a data warehouse 656, a membership or user database 658, product database 660, and the like.

In a preferred embodiment, the product ordering tool 630 includes one or more of the features of the ORDERSTAR® software module, e.g. online order processing, product availability, customized product catalogs, real time shipping information, individual shopping cart, an account maintenance section, information security (user login), private branding capabilities, online support, open development and integration standards, and the like. The reporting tool 632 preferably includes the capability for reporting by ESN, inventory, order history, sales history, and the like. The reporting tool 632 preferably uses the same Internet security access and profiling as the ordering tool 630. The GUI processors 642 and 644 preferably have a similar look and feel.

Figure 9:
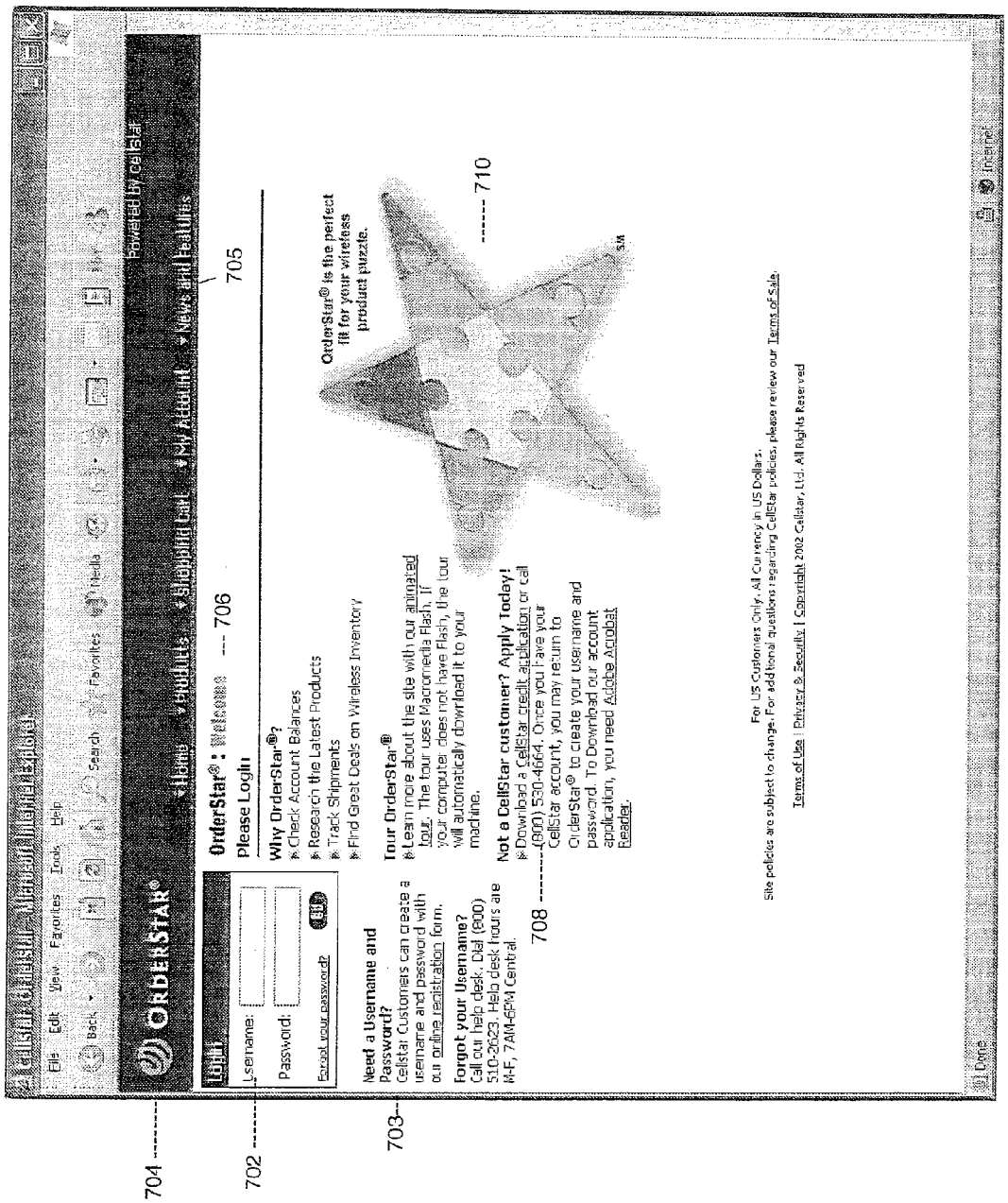

FIGS. 9-18 show a representative set of interface display screens for the GUI processor 642 associated with the typical placement of an order using the ordering tool 630. FIG. 9 shows an exemplary login screen 700 on a conventional web browser, including a login area 702 for inputting a username and password, and a new user area 703 with a link to an online self-registration screen (not shown). A banner area 704 is included for the display of the website manager graphics and trademarks, as well as a site navigation bar 705. If desired, banner area 704 can include graphics and/or trademarks specific to the carrier or other private branding for brand consistency. In either case, the banner area 704 and associated branding logos, custom colors and fonts are desirably uniform throughout the site for brand consistency. A customized page header 706 for each type of screen appears throughout the site. An information area 708 is a section dedicated for the display of information about the customized website which can include links to additional informational content. A promotional area 710 can be reserved for promotions and advertisements, preferably with a consistent branding image.

Figure 10:
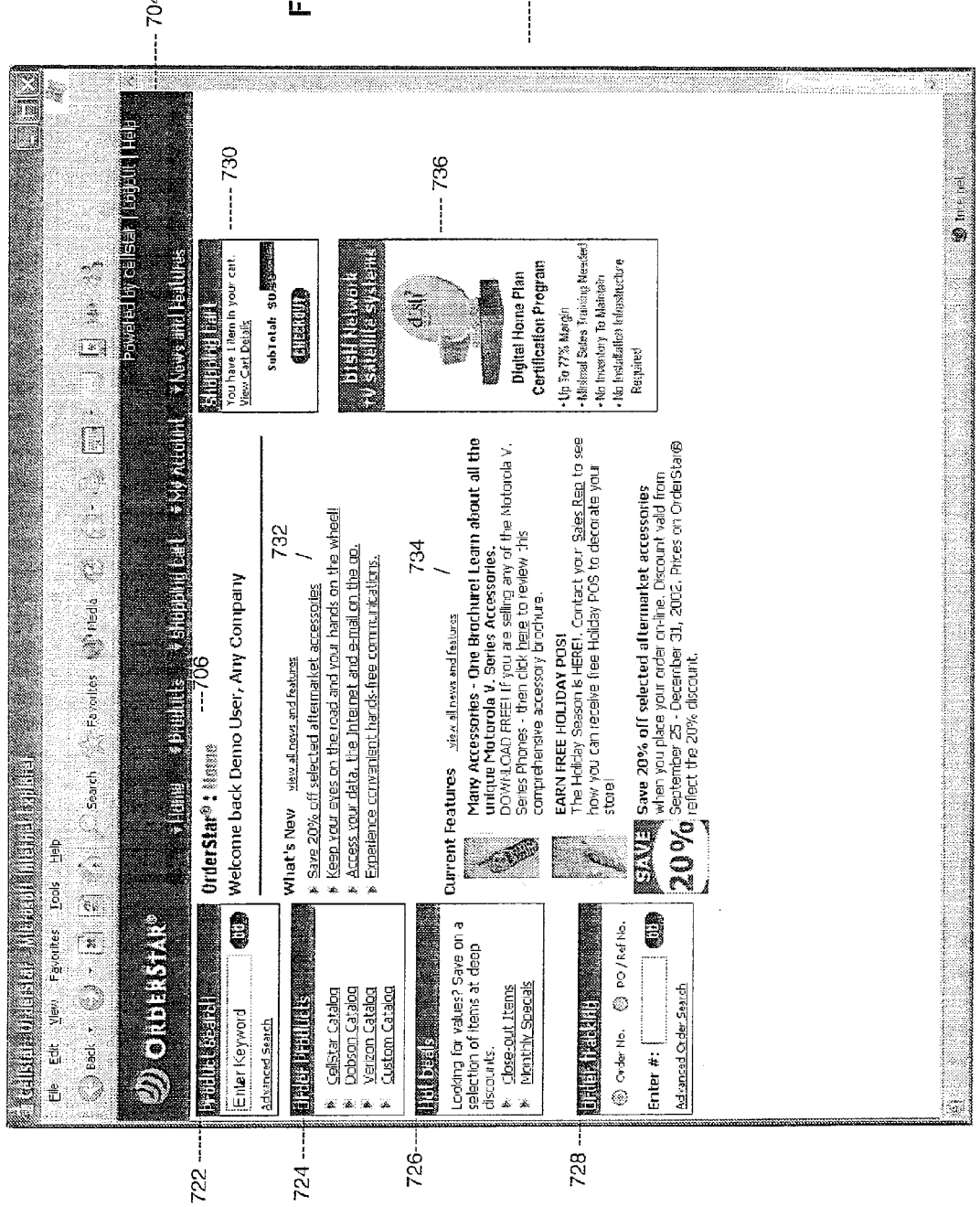

FIG. 10 shows a typical home page 720 to which the user is directed following login. The home page can include a product search area 722, a customized catalog selection area 724 for targeting products to the appropriate market segment, a mini-promotional area 726, an order tracking section 728 for checking on the status of an order or viewing previous orders, and a shopping cart area 730. The catalog menu includes a link to a custom catalog created for and maintained by the user, e.g. for the user to quickly access frequently ordered items. The shopping cart area 730 displays the shopping cart subtotal and includes a link to the cart details. The home page can also include a mini-marketing message area 732, a major marketing message area 734, and one or more ad banners 736, each of which can be targeted to specific branding customers. Targeted marketing presents material to the requestor based on profile-driven considerations, date range, catalog selection, site section, or the like. All targeted marketing preferably includes links to an outside URL, PDF, product listing (see FIG. 11), product detail (see FIG. 12), or the like, or can simply display a message.

Figure 11:
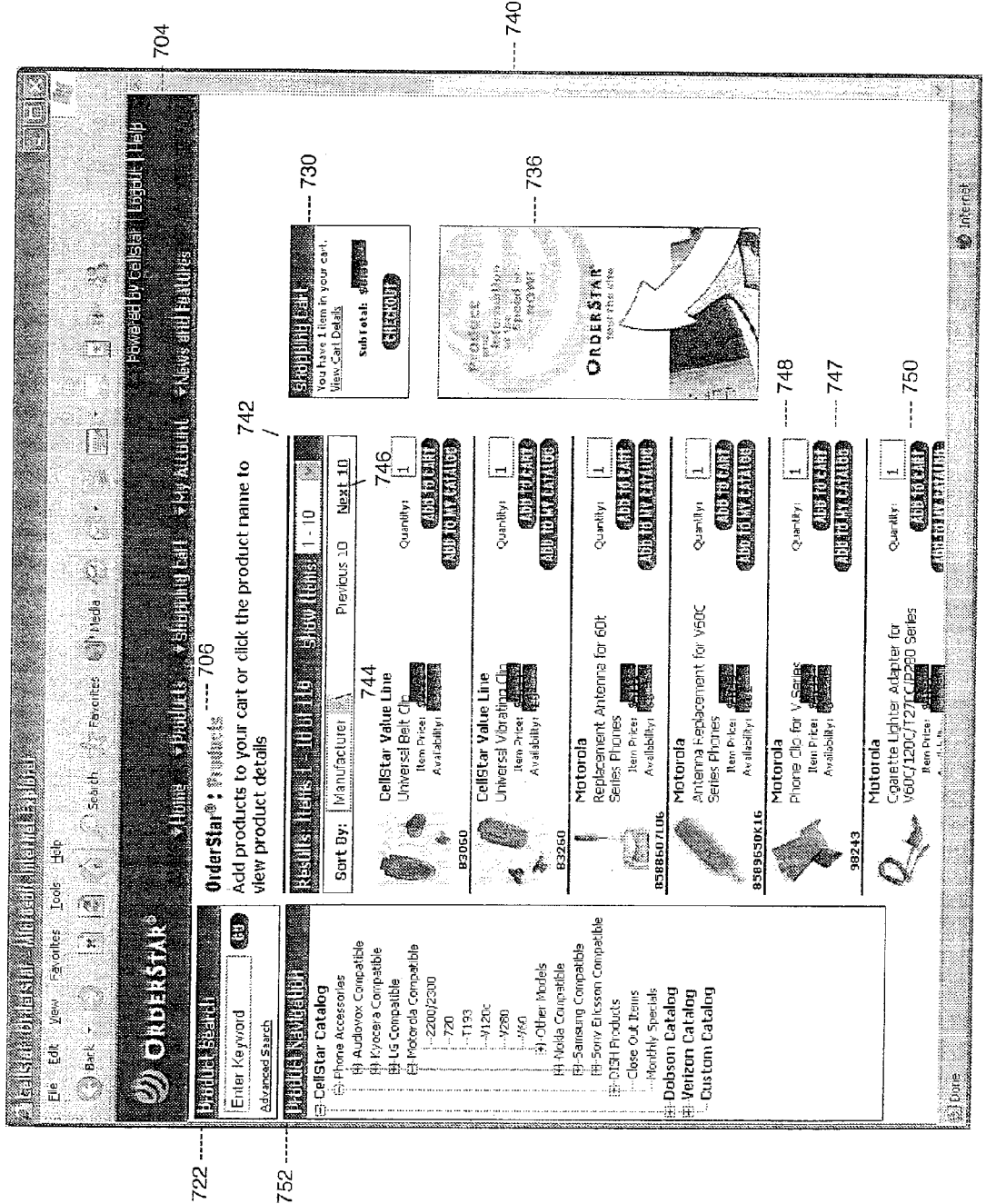

FIG. 11 shows a typical product listing page 740 including a product list area 742 showing a product image thumbnail, and real time price and availability for each product listed. The availability can be indicated by quantity or a simple indication of "available" or "unavailable." The product list area 742 can also include a sort-by pull down menu 744 and scrolling feature 746. Hot-button 747 provides the ability to quickly add a listed item to the user's custom catalog. Quantity input entry 748 (default set to 1 or another pre-selected value) and hot button 750 provide the ability to quickly add the selected item to the shopping cart. A product navigation area 752 displays a customized browsing taxonomy for each catalog available to the user.

Figure 12:
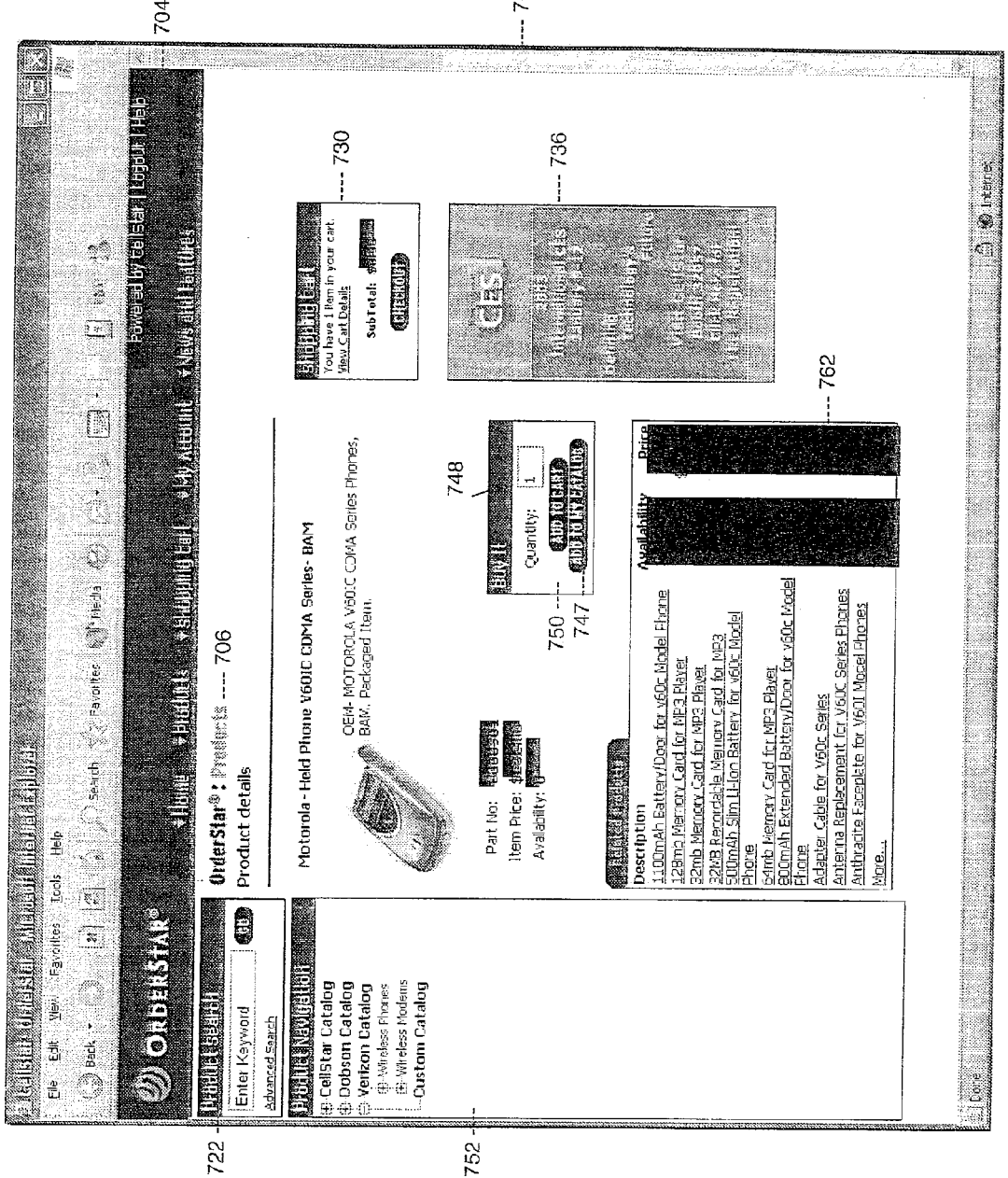

FIG. 12 shows an exemplary product detail page 760 including additional details and a larger image of the selected item, also including the price, availability, ordering and custom catalog entry features from FIG. 11. A related products menu 762 preferably provides navigation to detail pages for items that are comparable, related to or compatible with the selected item, along with real-time price and is availability.

Figure 13:
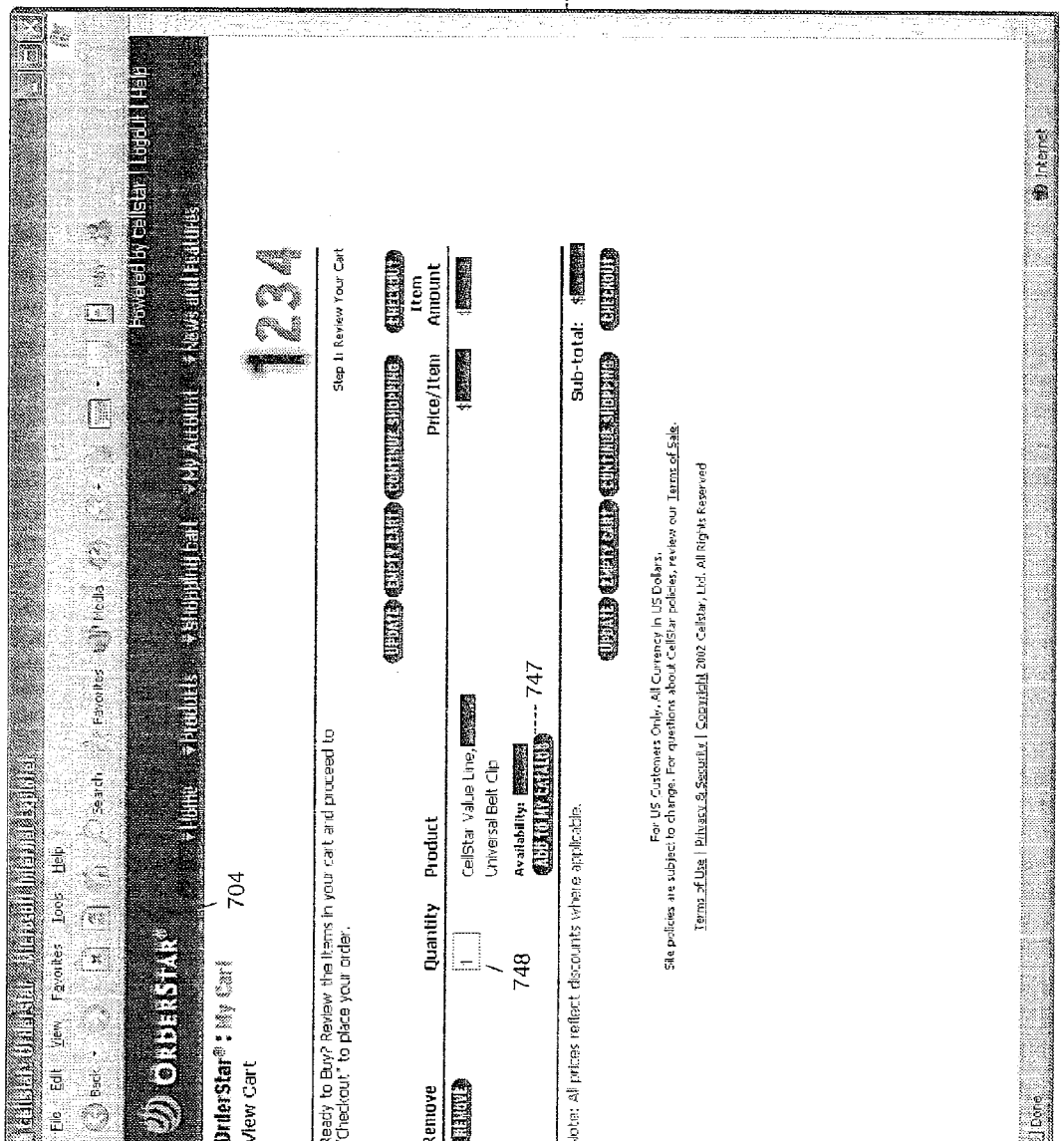
Figure 14:
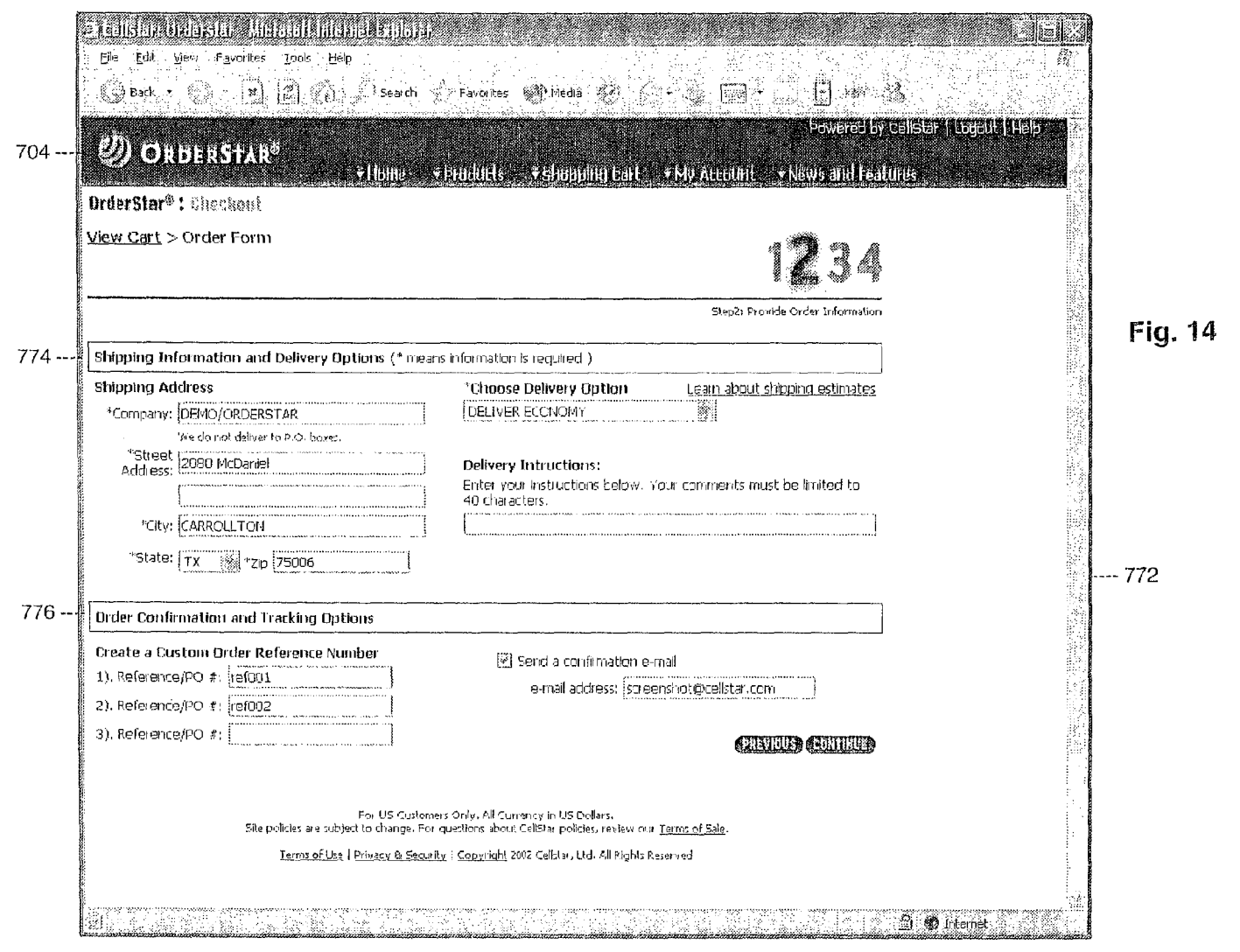
Figure 15:
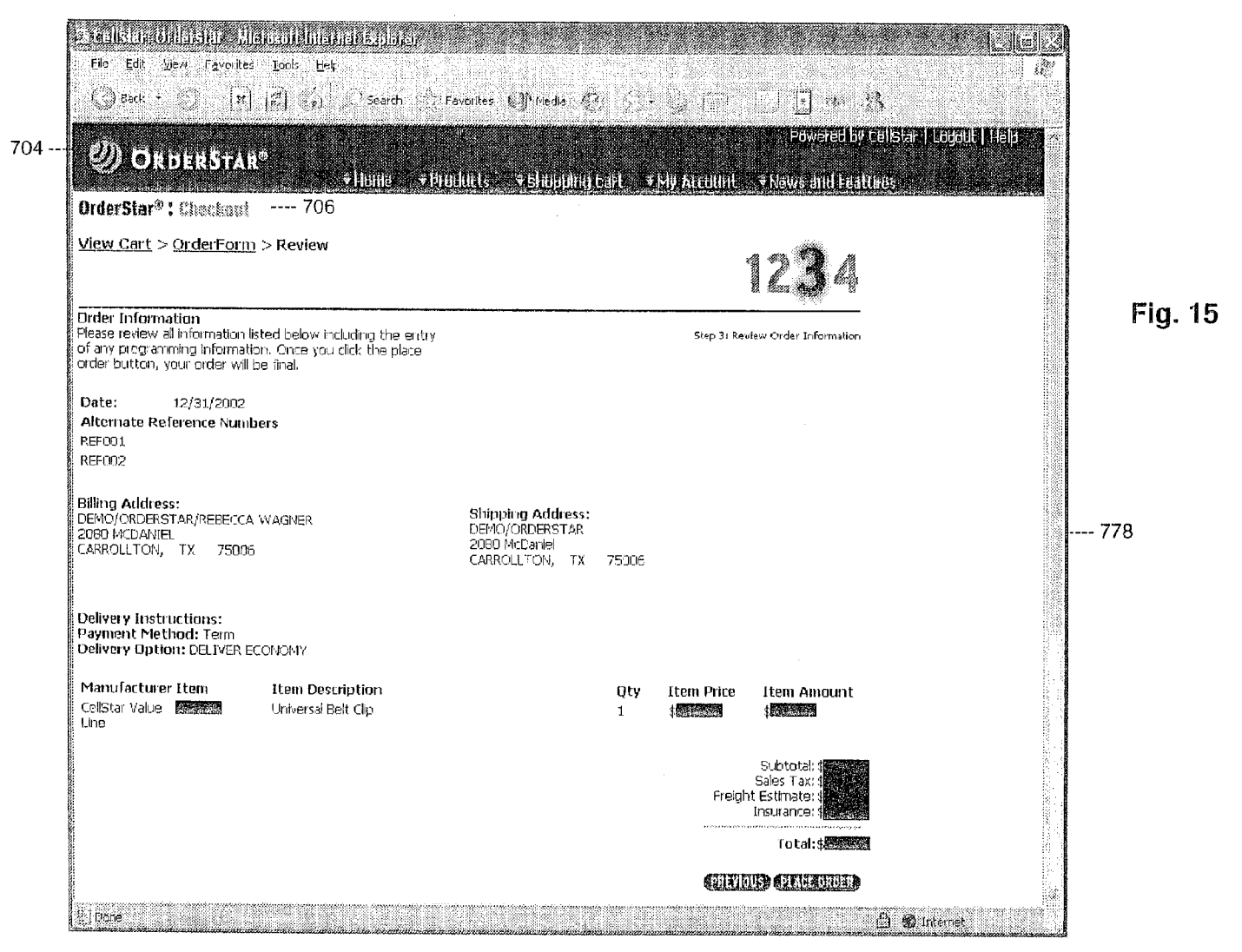
Figure 16:
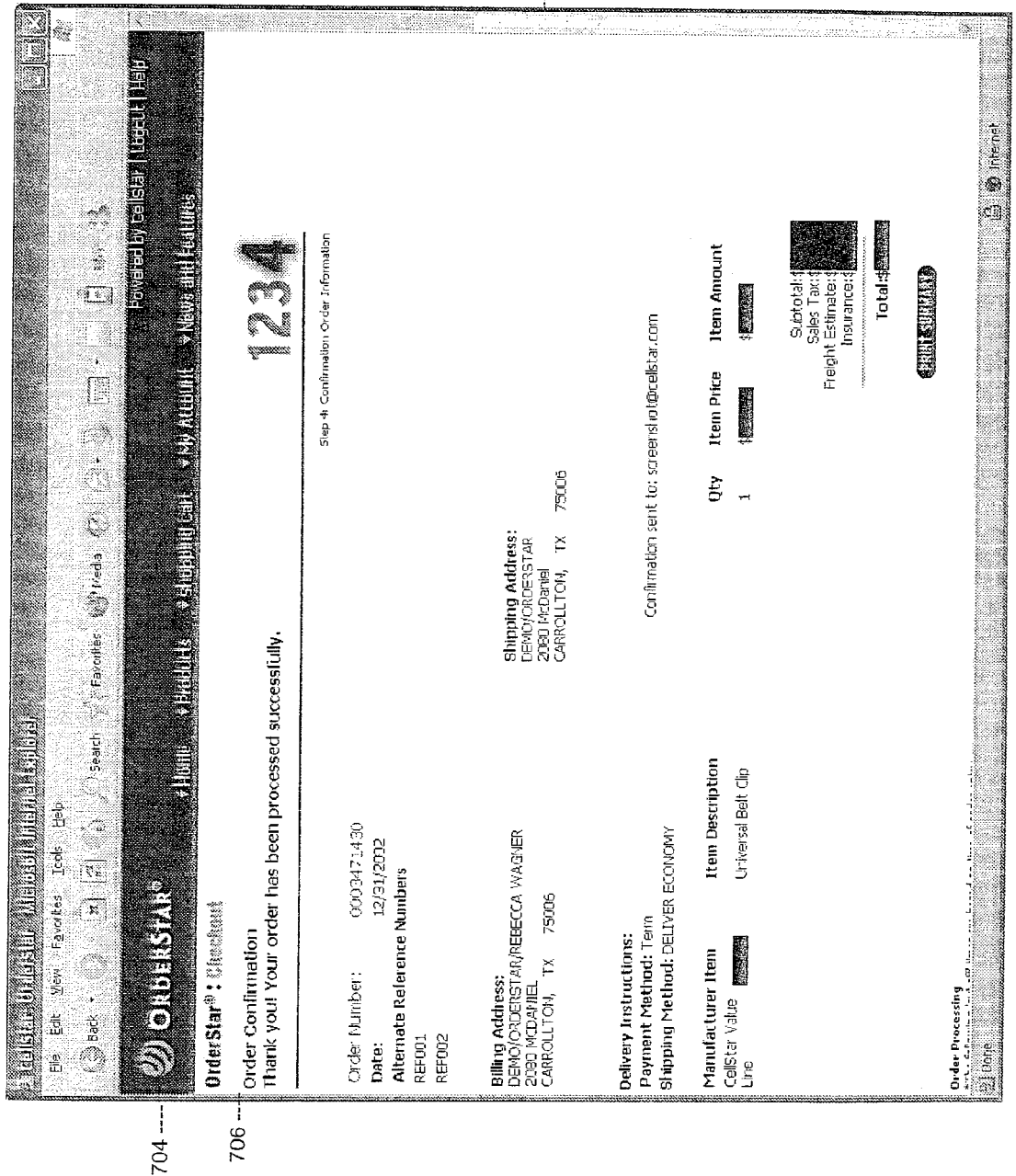

FIG. 13 shows a representative shopping cart page 770 for reviewing the selected items prior to checkout. The shopping cart view can also display the price and availability of each item, along with a product image (not shown) and description. In the shopping cart view, the user can remove items, adjust the quantity ordered, update the cart, empty the cart, continue shopping (revert to previous page), add the item to the user's custom catalog, or proceed to checkout screen 772 as seen in FIG. 14. Screen 772 includes input area 774, optionally with field-specific pull-down menus, for entry of shipping information and delivery options, and input area 776 for entry of order confirmation and tracking options, e.g. confirmation email and email address. The user can return to the previous screen to view and/or modify the shopping cart as previously described, or proceed to the order review screen 778 seen in FIG. 15. After reviewing the complete order information, the dealer agent can return to a previous screen to make any necessary modifications, or place the order and proceed to the order confirmation screen 780 of FIG. 16 and review the confirmation order information.

Figure 17:
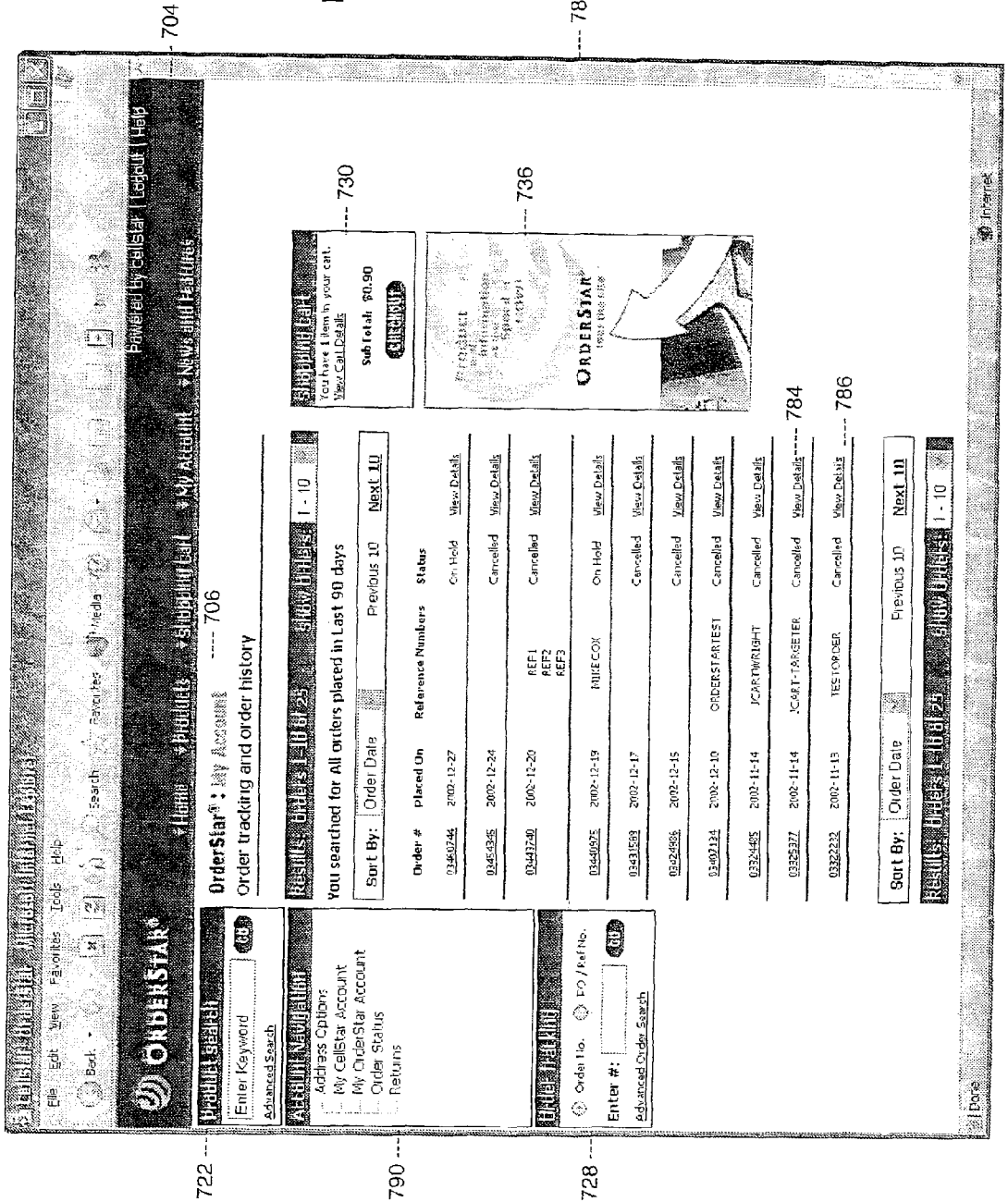
Figure 18:
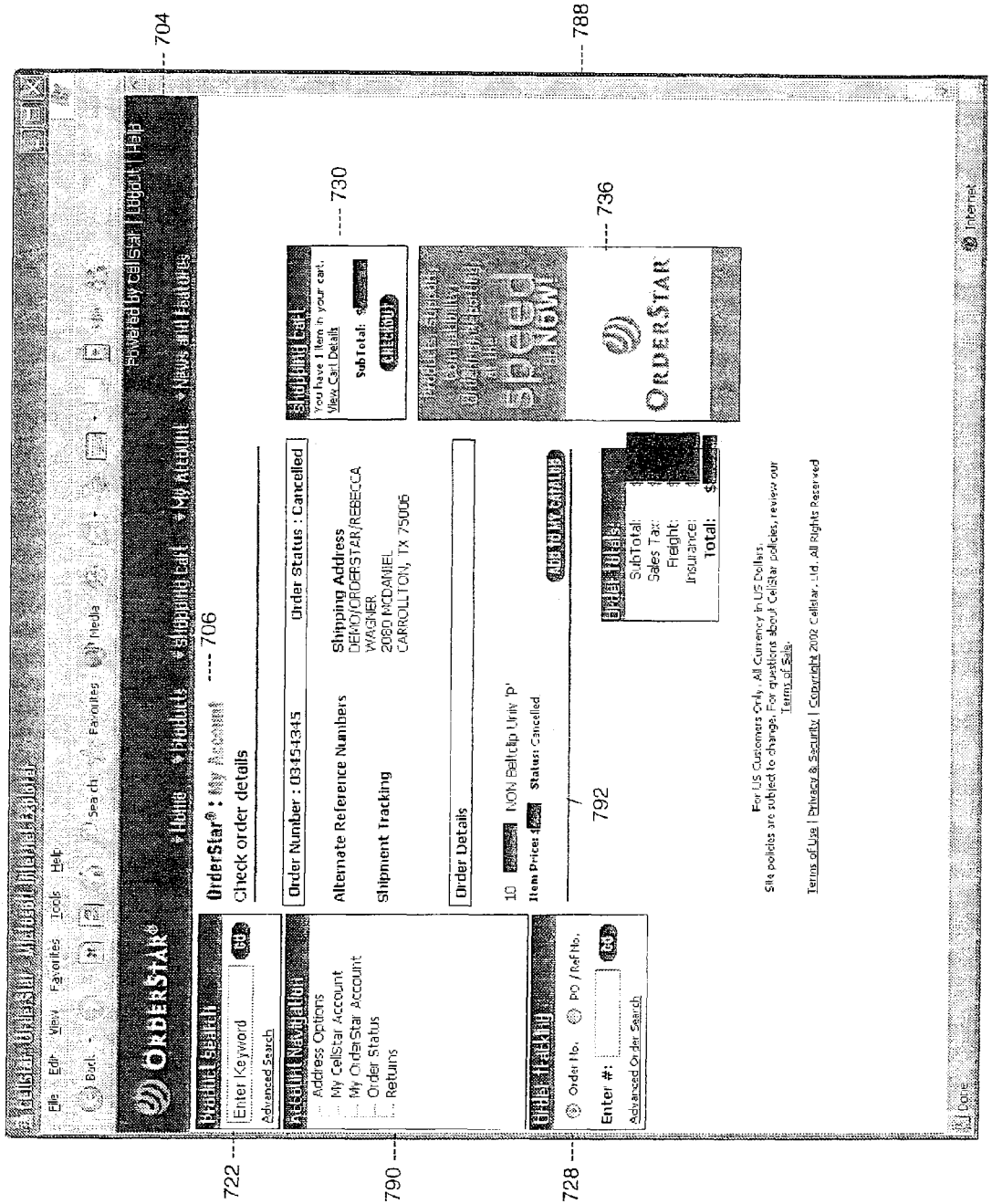

FIG. 17 shows a representative order status page 782 from the account section of the site with a display area 784 for a list of orders including order number, order date, reference numbers, and status information. The display area 784 preferably includes a search results title, search criteria, and list navigation functionality including a pull-down menu and scrolling, for example. The display area also includes navigation buttons 786 to order detail screen 788 (see FIG. 18) for order detail information 792 for each order. The order status page 782 and detail screen 788 also preferably include an account navigation area 790 to other account pages (not shown), such as, for example, to view and/or modify address options; view accounts specific to carrier, manufacturer, distribution center or the like; view order status; make returns; and so on.

In a preferred embodiment, content management tool 634 (FIG. 8) includes software for product management, channel marketing, and dealer management. The product management functionality preferably facilitates the control of product access by market and retail location; the management of inventory, returns and the fulfillment cycle; the tracking of inventory levels, sales figures, returns, refused shipments and outstanding purchase orders; and so on. The channel marketing allows the content manager to track user activity, top-selling products and most frequent user searches; to build custom promotions pages and automatically track high-demand products; to develop and publish targeted marketing messages and ad banners; and so on. The dealer manager functionality includes customer service and sales force automation, for example, and allows the content manager to manage dealer orders, e.g. review, modify and cancel dealer orders; to review dealer credit and billing history; and to distribute targeted messaging to sales or customer service representatives.

The content management tool 634 facilitates the management of dealer agents, product and marketing content through at a single site with a set of easy-to-use interfaces (see FIGS. 19-23). The tool 634 can make pre-existing product content web-ready and customer-friendly by integrating the carrier's content and/or hosting it in the channel management application 600, and/or by importing data from an existing enterprise resource planning system. The tool can also re-purpose and/or syndicate web-ready content to other business areas such as intranets, sales force automation tools, business-to-consumer web fulfillment, and so on.

Figure 19:
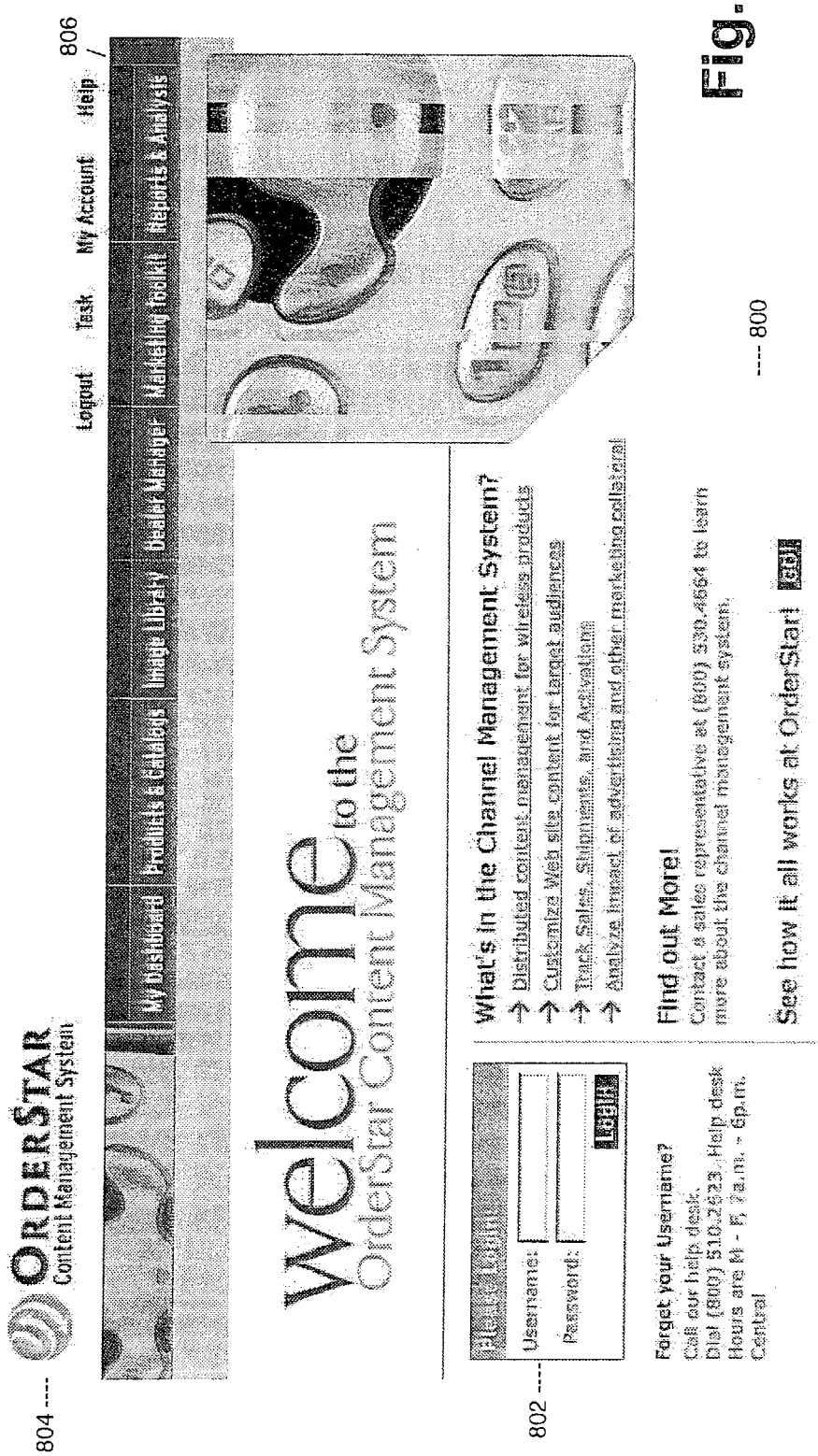

FIG. 19 shows an exemplary login screen 800 viewable with a web browser, including a login area 802 for inputting a username and password. A banner area 804 is included for the display of the website manager graphics and trademarks, as well as a site navigation bar 806. If desired, banner area 804 can include graphics and/or trademarks specific to the channel management application host or other private branding for brand consistency. In either case, the banner area 804 and associated branding logos, custom colors and fonts are desirably uniform throughout the site for brand consistency. An information area 808 is a section dedicated for the display of information about the customized website and can include links to additional informational content as indicated in the drawing.

Figure 20:
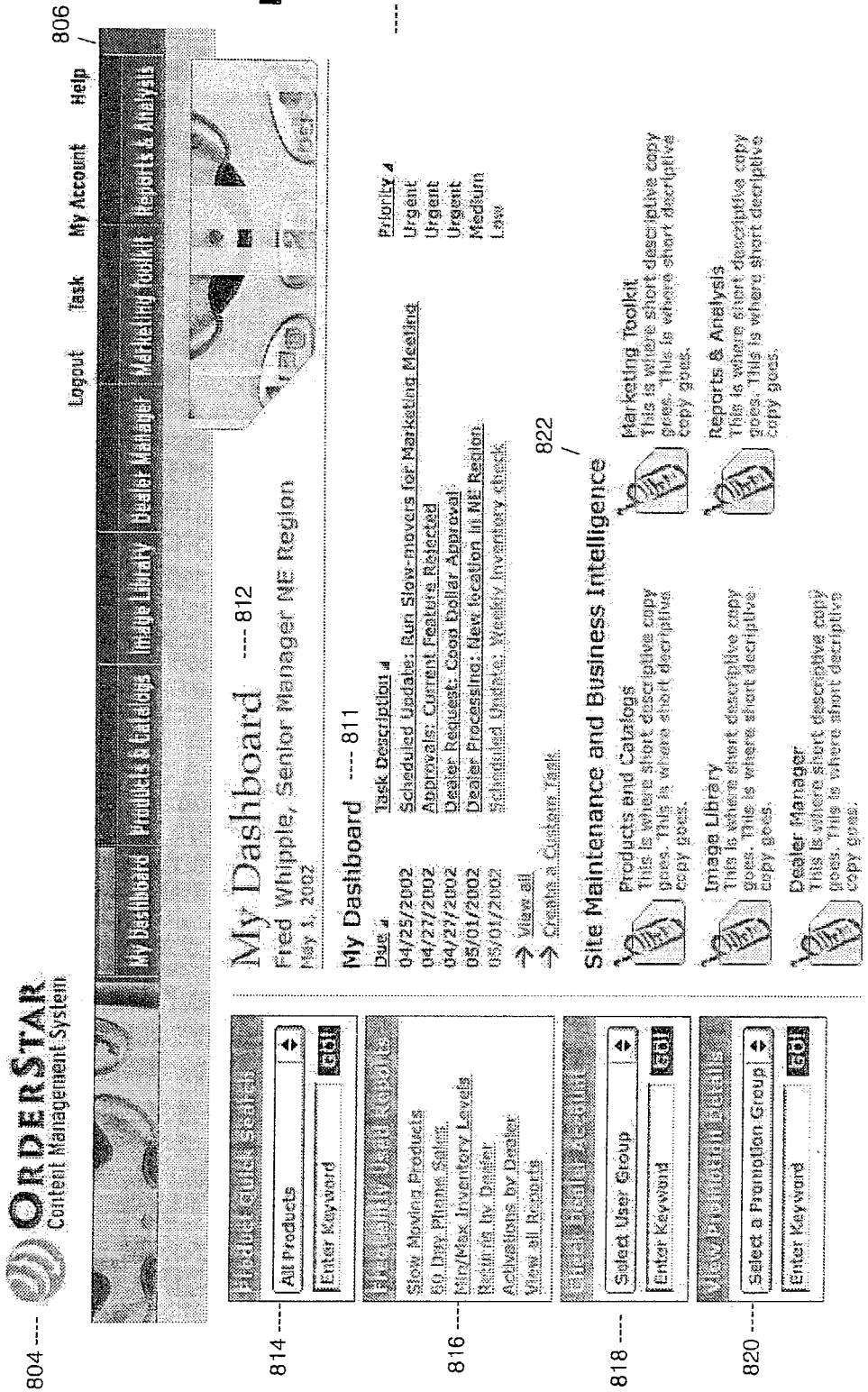

Upon completion of login, the user is directed to a home page or "dashboard" 810 as shown in FIG. 20. The dashboard 811 includes a list of tasks sorted by due is date with a brief task description and priority, and also includes an expanded "view all" listing option and new or custom task entry navigation. A customized page header 812 for each type of screen appears throughout the site. A product quick search area 814 can provide a pull-down menu for product type, keyword entry and launch features. A frequently used reports box 816 provides navigation to reports for slow moving products, 60-day phone sales, minimum and maximum inventory levels, returns by dealer, activations by dealer, a complete listing of reports, and the like. A check dealer account box 818 provides a pull-down menu for user groups, keyword entry and search launch. A view promotion details box 820 provides a pull-down menu for promotion groups, keyword entry and search launch. Additional site navigation area 822 can provide icons and site area descriptions corresponding to the navigation bar 806.

Figure 21:
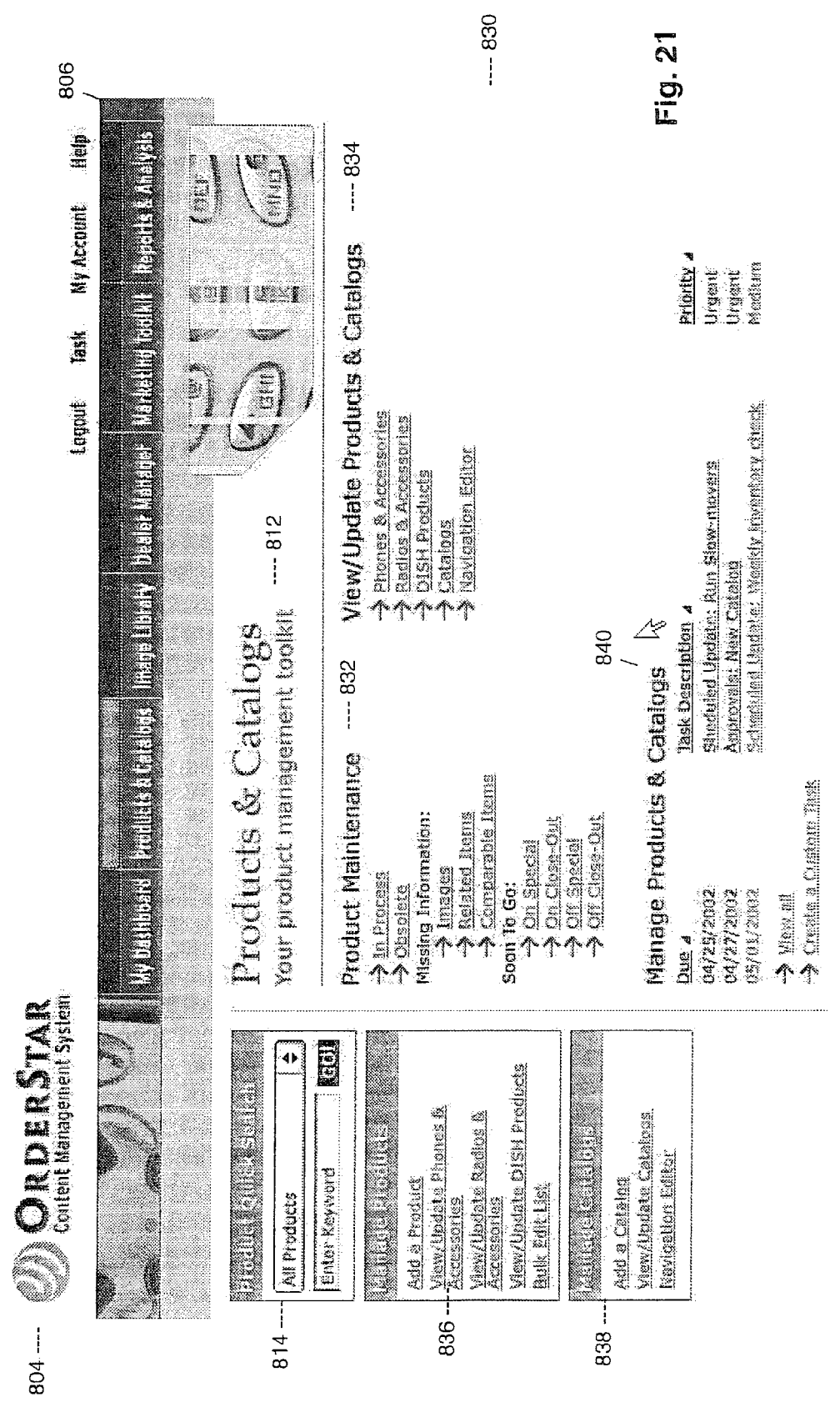

A products and catalogs landing screen 830 is seen in FIG. 21. A main product maintenance area 832 provides navigation to product maintenance in process, obsolete products, missing information such as images, related items, comparable items and the like, soon to go items such as on special, on close-out, off special, off close-out and the like, and so on. A main view/update products and catalogs area 834 provides navigation to various product types and catalogs, as well as a navigation editor. Similar product management box 836, including a bulk editing access feature, and catalog management box 838 are provided to the left with product quick search area 814. The listing and functionality of the product and catalog tasks from the dashboard 811 is presented in a main products and catalogs management area 840.

A marketing toolkit landing screen 842 is seen in FIG. 22. A main promotions maintenance area 844 provides navigation to promotions in process such as current features, dealer updates, ad banners, and the like, as well as to marketing messages about to expire, sales reports for promotional items, referring collateral for promotions, and view of all reports. A main view/update promotions area 846 provides navigation to current features, dealer updates, ad banners, and the like. A manage promotions box 848 including similar navigation to adding, viewing or modifying current features, dealer updates, and ad banners is provided to the left along with another view promotions box 820. The listing and functionality of the marketing content and collateral management tasks from the dashboard 811 is presented in a main marketing content and collateral management area 850.

A typical reports and analysis landing screen 852 is shown in FIG. 23. This includes a main frequently used reports navigation area 854 with the navigation features from box 816, and an expanded navigation area 856 with launch icons and short descriptions for navigation to various report types and analysis functions such as inventory and sales, site activity and feedback, dealer management, product and catalog maintenance, image tracking, marketing and promotion content, and the like.

A similar reports and analysis navigation box 858 is provided on the left, along with an alerts box 860.

The level of ability to order and replenish equipment online according to the present invention reduces the cost for the carrier to serve the indirect dealer agent channel, and achieves a more consistent and uniform order processing. For the independent dealer agent, the invention facilitates an easy and reliable handset and accessory ordering interface, and can provide the convenience of multiple payment options and the savings of volume discounts. The equipment tracking integration avoids so-called "trans-shipping" of product subsidized by the carrier, and minimizes fraud by facilitating the association of ESN's to activated customers. The dealer agents similarly have facilitated inventory tracking and a reduced working capital requirement. The online communication channel facilitates the carrier's delivery of marketing and branding messages in real time, for example, promotions, coop changes, rate plan data, rebates and the like. The dealer agents enjoy online provision of collateral and training material, and an always-on, real-time link to the carrier.

The present invention has the potential for reducing carrier costs and increasing the sales potential. The channel management application can reduce order processing, shipping and tracking costs; reduce information technology expenditures through system integration and reporting consolidation; and reduce the costs for promotional and collateral material. Simultaneously, the channel management application improves the ability to sell higher margin products and plans, can increase the accessory attachment rate, and facilitates the application of coop payments to purchases by dealer agents.

Exemplary software that can be used to implement the invention in one embodiment is listed in the computer program listing appendix.

The invention claimed is:

1. A method for distributing wireless telecommunication devices via an indirect dealer agent channel, comprising the steps of:
   (a) establishing data interfaces between distribution channel manager software and a plurality of wireless dealer agents for at least one carrier, the distribution channel manager software comprising a presentation layer for the exchange of data with the dealer agents, wherein the presentation layer is operatively coupled with business function software modules comprising a product ordering module, activation and credit scoring module, commissions management module, and coop management module, and optionally software modules for product and service management, and report generation;
   (b) operating the product ordering module to process orders placed by the dealer agents via the presentation layer for inventory replenishment and arrange for delivery of wireless products from at least one distribution center to the respective dealer agents;
   (c) operating the activation and credit scoring module to perform credit scoring on customers based on data entered via the presentation layer, to receive confirmation or conditions from the at least one carrier for the establishment of wireless service for the customers, and to activate wireless devices to establish the customers as subscribers of the at least one carrier;
   (d) operating the commissions management module to calculate commission payments to each dealer agent by the at least one carrier based on the activations from step (c) that are validated and any charge backs applicable to the respective dealer agent;
   (e) operating the coop management module to develop marketing concepts for each dealer agent, develop advertising copy and design based on the concepts, arrange for approval of the copy and design by the at least one carrier, and receive a coop payment from the carrier on behalf of the dealer agent;

(f) operatively establishing an interface between the at least one carrier and a content management and delivery module of the distribution channel manager software for receiving wireless marketing program information from the at least one carrier for use in the data interfaces in step (a), the product ordering operation of step (b), the activation and credit scoring operation of step (c), the commissions management operation of step (d), the coop management of step (e), or two or more of steps (a)-(e).

2. The method of claim 1 wherein the channel management software includes a communication layer for exchanging data between the presentation layer and a channel management database.

3. The method of claim 2 wherein the interface with the at least one carrier is via the presentation layer, and the interface of the content management and delivery module is via the communication layer.

4. The method of claim 1 wherein step (a) includes profiling the user at log on using a username and password to determine the type of interface to be established and to establish an access level to the software modules, content and database.

5. The method of claim 1 wherein the product ordering operation includes forecasting sales to create a sales forecast for a respective dealer agent based on data entered via the data interface, ordering wireless handsets and accessories for the respective dealer agent based on the sales forecast, tracking and receiving the orders, reporting on sold product, updating the sales forecast based on sold product, and reconciling activations with electronic serial numbers (ESN's).

6. The method of claim 1 wherein the wireless marketing program information includes carrier service rate plan information, commission information, rebate information, market directed funding information, sales-performance-incentives-for-free (SPFF) information, collateral material information, training information on wireless products and services, and sales tools.

7. The method of claim 1, comprising interfacing with multiple carriers, wherein one or more of the dealer agents are authorized for activations with more than one of the carriers.

8. The method of claim 1, comprising placing wireless product orders with more than one distribution center.

9. The method of claim 1, comprising capturing point of sale information during the activation and credit scoring operation of step (c) and storing the point of sale information in the channel management database.

10. The method of claim 9 comprising using the point of sale information in sales forecasting.

11. The method of claim 9 comprising mining the point of sale information for metrics reporting to the carrier, one or more of the manufacturers or another third party.

12. The method of claim 1 wherein the channel management software includes a business report generation module.

13. A wireless indirect dealer agent management method using an integrated channel management system, comprising:

(a) establishing a data link with the channel management system;

(b) a dealer agent ordering and payment module comprising the steps of:
  (1) forecasting sales to create a sales forecast based on recent sales and data received via the channel management system;
  (2) ordering products comprising wireless handsets and accessories via the channel management system based on the sales forecast from (b)(1) and carrier marketing information;
  (3) tracking and receiving orders via the channel management system;
  (4) obtaining reports on products sold;
  (5) reconciling activations with electronic serial numbers via the channel management system;

(c) a product marketing module comprising the steps of:
  (1) accessing rate plan information posted by a carrier to the channel management system;
  (2) accessing marketing information posted by the carrier to the channel management system for use in step (b)(2);
  (3) developing point of sale materials for products ordered via the channel management system;
  (4) training sales personnel for the products ordered and services of the carrier via the channel management system;
  (5) using online sales tools available via the channel management system;

(d) a coop management module comprising the steps of:
  (1) developing marketing concepts based on the marketing information from step (b)(2);
  (2) developing ad copy and design corresponding to the concepts of (c)(1);
  (3) submitting the ad copy and design for carrier approval via the channel management system;
  (4) obtaining carrier approval for the ad copy and design;
  (5) receiving coop payment for the ad copy and design via the channel management system;

(e) a product activation module comprising the steps of:
  (1) performing a credit scoring for a service subscription via the channel management system;
  (2) receiving confirmation of credit approval or conditions for service activation via the channel management system;
  (3) activating the subscription in accordance with the approval or conditions via the channel management system for use of activation data in step (b)(5);

(f) a commission payment module comprising the steps of:
  (1) calculating expected commissions based on the activations reconciliation from step (b)(5);
  (2) receiving an activation report via the channel management system;
  (3) validating the activation report via the channel management system;
  (4) receiving commission payments via the channel management system.

14. The method of claim 13 wherein the data link is an Internet connection.

15. The method of claim 13 wherein the marketing information comprises commission rates, rebates offered by the carrier or product manufacturer, available market-directed funding, and sales-performance-incentives-for-free.

* * * * *